US012689280B2

(12) United States Patent
Morton et al.

(10) Patent No.: US 12,689,280 B2
(45) Date of Patent: Jul. 21, 2026

(54) MAGNETIC COUPLING DEVICE

(71) Applicant: Magswitch Automation Company,
Superior, CO (US)

(72) Inventors: David H. Morton, Boulder, CO (US);
Paul J. Karp, Thornton, CO (US);
Yiwei Yan, Broomfield, CO (US)

(73) Assignee: Magswitch Automation Company,
Superior, CO (US)

( * ) Notice: Subject to any disclaimer, the term of this
patent is extended or adjusted under 35
U.S.C. 154(b) by 0 days.

(21) Appl. No.: 19/213,305

(22) Filed: May 20, 2025

(65) Prior Publication Data

US 2026/0081510 A1     Mar. 19, 2026

Related U.S. Application Data

(63) Continuation of application No. 18/869,079, filed as
application No. PCT/US2023/024971 on Jun. 9,
2023, now Pat. No. 12,323,024.

(60) Provisional application No. 63/448,033, filed on Feb.
24, 2023, provisional application No. 63/351,349,
filed on Jun. 11, 2022.

(51) Int. Cl.
H02K 49/10          (2006.01)
H02K 11/21          (2016.01)

(52) U.S. Cl.
CPC ........... H02K 49/108 (2013.01); H02K 11/21
(2016.01)

(58) Field of Classification Search
CPC ............................. H02K 49/108; H02K 11/21
USPC ....................................................... 310/103
See application file for complete search history.

(56) References Cited

U.S. PATENT DOCUMENTS

| | | | |
|---|---|---|---|
| 3,017,545 A | 1/1962 | Meier | |
| 3,184,654 A | 5/1965 | Bey | |
| 4,055,824 A | 10/1977 | Baermann | |
| 4,401,960 A | 8/1983 | Uchikune et al. | |
| 5,382,935 A | 1/1995 | Doyelle | |
| 5,435,613 A | 7/1995 | Jung | |
| 6,292,078 B1 | 9/2001 | Cardone et al. | |
| 6,331,810 B1 | 12/2001 | Jung | |
| 6,636,153 B1 | 10/2003 | Barton et al. | |
| 7,012,495 B2 | 3/2006 | Underwood et al. | |
| 7,049,919 B2 | 5/2006 | Yamaki | |
| 7,161,451 B2 | 1/2007 | Shen | |
| 8,031,038 B2 | 10/2011 | Kimura | |

(Continued)

FOREIGN PATENT DOCUMENTS

| | | |
|---|---|---|
| CA | 2300422 A1 | 12/1999 |
| CN | 201882760 U | 6/2011 |

(Continued)

OTHER PUBLICATIONS

Gupta et al.; Simulation and Prototyping of Saturable Magnetic
Switch for Current Pulse Compression; 2019 IEEE 4th International
Conference on Condition Assessment Techniques in Electrical Sys-
tems (CATCON); IEEE; 2019.

(Continued)

*Primary Examiner* — Jose A Gonzalez Quinones
(74) *Attorney, Agent, or Firm* — Faegre Drinker Biddle &
Reath LLP

(57)          ABSTRACT

Magnetic coupling devices are disclosed. The magnetic
coupling devices may include at least one permanent magnet
and at least one ferromagnetic core. The at least one per-
manent magnet may surround the at least one ferromagnetic
core.

20 Claims, 27 Drawing Sheets

(56) References Cited

U.S. PATENT DOCUMENTS

| | | | |
|---|---|---|---|
| 8,183,965 | B2 | 5/2012 | Michael |
| 8,256,098 | B2 | 9/2012 | Michael |
| 8,350,663 | B1 | 1/2013 | Michael |
| 8,604,900 | B2 | 12/2013 | Kocijan |
| 8,641,105 | B2 | 2/2014 | Goodman et al. |
| 8,878,639 | B2 | 11/2014 | Kocijan |
| 9,514,904 | B2 | 12/2016 | Dai et al. |
| 10,903,030 | B2 | 1/2021 | Morton et al. |
| 10,971,292 | B2 | 4/2021 | Arnold et al. |
| 11,097,401 | B2 | 8/2021 | Morton et al. |
| 11,839,954 | B2 | 12/2023 | Morton et al. |
| 11,901,142 | B2 | 2/2024 | Morton et al. |
| 11,931,846 | B2 | 3/2024 | Morton et al. |
| 12,100,545 | B2 | 9/2024 | Morton et al. |
| 12,112,889 | B2 | 10/2024 | Morton |
| 12,323,024 | B2 | 6/2025 | Morton et al. |
| 2007/0013468 | A1 | 1/2007 | Heard |
| 2008/0129433 | A1 | 6/2008 | Evertz et al. |
| 2009/0027149 | A1 | 1/2009 | Kocijan |
| 2013/0320686 | A1 | 12/2013 | Morton |
| 2016/0289046 | A1 | 10/2016 | Norton et al. |
| 2017/0103839 | A1 | 4/2017 | Choi |
| 2018/0311795 | A1 | 11/2018 | Morton et al. |
| 2018/0315563 | A1 | 11/2018 | Morton et al. |
| 2021/0031317 | A1 | 2/2021 | Morton et al. |
| 2021/0122011 | A1 | 4/2021 | Kitaura et al. |
| 2021/0268615 | A1 | 9/2021 | Morton et al. |
| 2025/0112538 | A1 | 4/2025 | Morton et al. |

FOREIGN PATENT DOCUMENTS

| | | | | |
|---|---|---|---|---|
| CN | 104209892 | A | 12/2014 | |
| DE | 2704118 | A1 | 11/1977 | |
| DE | 102010029681 | A1 | 12/2011 | |
| DE | 102014116676 | A1 | 5/2016 | |
| EP | 0630851 | A1 | 12/1994 | |
| EP | 1036753 | A2 | 9/2000 | |
| GB | 0531946 | A | 1/1941 | |
| GB | 2211356 | A | 6/1989 | |
| WO | 2009/000008 | A1 | 12/2008 | |
| WO | WO-2015071878 | A1 * | 5/2015 | ............... B66C 1/04 |
| WO | WO-2018227140 | A1 * | 12/2018 | ............... B66C 1/06 |
| WO | WO-2019148159 | A1 * | 8/2019 | ............ B23Q 3/154 |

OTHER PUBLICATIONS

Kim et al.; Design and Analysis Method for a DC Magnetic Contactor with a Permanent Magnet; 2014 17th International Conference on Electrical Machines and Systems (ICEMS); IEEE; 2014.

Sanati et al.; Optimization of Geometry and Dimensions of Magnetic Switch Core with Approach of Flux Density Uniformity; 2019 International Power System Conference (PSC); IEEE; Oct. 2019.

* cited by examiner

MAGNETIC COUPLING DEVICE

RELATED APPLICATION

The present application is a continuation application of Application Serail No. Ser. No. 18/869,079, filed Nov. 25, 2024, titled MAGNETIC COUPLING DEVICE, which is a national stage application of PCT Patent Application Serial No. PCT/US23/24971, filed Jun. 9, 2023, titled MAGNETIC COUPLING DEVICE, which claims the benefit of US Provisional Application Ser. No. 63/351,349, filed Jun. 11, 2022, titled MAGNETIC COUPLING DEVICE and US Provisional Application Ser. No. 63/448,033, filed Feb. 24, 2023, titled MAGNETIC COUPLING DEVICE, the entire disclosures of which are expressly incorporated by reference herein.

TECHNICAL FIELD

The present disclosure is related to magnetic coupling devices and in particular to magnetic coupling devices having permanent magnets and ferromagnetic cores.

BACKGROUND

Magnetic coupling devices are known. Exemplary coupling devices are disclosed in U.S. Pat. Nos. 7,012,495, 8,878,639, and US Published Patent Application No. 20180311795.

SUMMARY

In an exemplary embodiment of the present disclosure, a magnetic coupling device for magnetically coupling to a ferromagnetic workpiece is provided. The magnetic coupling device comprising a housing; a switchable magnetic flux source supported by the housing; and a plurality of pole portions, each having at least one workpiece engagement surface. The switchable magnetic flux source being switchable between at least an OFF state and an ON state. The switchable magnetic flux source including at least one permanent magnet and at least one ferromagnetic core. The at least one permanent magnet surrounding the at least one ferromagnetic core.

In an example thereof, the at least one permanent magnet and the at least one ferromagnetic core are recessed relative to the at least one workpiece engagement surface of each of the plurality of pole portions.

In another example thereof, the at least one permanent magnet includes a first permanent magnet and the at least one ferromagnetic core includes a first ferromagnetic core, the first permanent magnet surrounds the first ferromagnetic core and the first permanent magnet and the first ferromagnetic core are rotatable relative to the housing about a first axis. In a variation thereof, the at least one permanent magnet includes a second permanent magnet, the second permanent magnet surrounds the first ferromagnetic core. In another variation thereof, the second permanent magnet is spaced apart from the first permanent magnet. In a further variation thereof, each of the first permanent magnet and the second permanent magnet surrounds a circumference of the ferromagnetic core. In yet a further variation thereof, the second permanent magnet is rotatable relative to the housing about the first axis. In still another variation thereof, the first permanent magnet, the second permanent magnet, and the first ferromagnetic core are rotatable relative to the housing about the first axis as a group.

In a further example thereof, the at least one permanent magnet includes a first permanent magnet and a second permanent magnet and the at least one ferromagnetic core includes a first ferromagnetic core and a second ferromagnetic core. The first permanent magnet surrounds the first ferromagnetic core and the second permanent magnet surrounds the second ferromagnetic core. In a variation thereof, the first permanent magnet is spaced apart from the second permanent magnet and the first ferromagnetic core is spaced apart from the second ferromagnetic core. In another variation thereof, the second permanent magnet is rotatable relative to the first permanent magnet about a first axis and the second ferromagnetic core is rotatable relative to the first ferromagnetic core about the first axis. In a further variation thereof, the second permanent magnet and the second ferromagnetic core are rotatable relative to the housing about the first axis as a group. In still a further variation thereof, the first permanent magnet surrounds a circumference of the first ferromagnetic core and the second permanent magnet surrounds a circumference of the second ferromagnetic core.

In still another example thereof, an outer diameter of the first ferromagnetic core has a value in the range of 30% to 80% of an outer diameter of the first permanent magnet. In a variation thereof, the outer diameter of the first ferromagnetic core has a value in the range of 50% to 80% of the outer diameter of the first permanent magnet. In another variation thereof, the outer diameter of the first ferromagnetic core has a value in the range of 50% to 70% of the outer diameter of the first permanent magnet.

In yet still another example thereof, an outer diameter of the first ferromagnetic core has a value of at least 50% of an outer diameter of the first permanent magnet. In a variation thereof, the outer diameter of the first ferromagnetic core has a value of at least 60% of the outer diameter of the first permanent magnet. In a further variation thereof, the outer diameter of the first ferromagnetic core has a value of at least 70% of the outer diameter of the first permanent magnet.

In a further still example thereof, the magnetic coupling device further comprises an actuator. In a variation thereof, the at least one permanent magnet is coupled to the actuator through the at least one ferromagnetic core.

In yet another example thereof, the plurality of pole portions include a first pole portion, a second pole portion, and a third pole portion and the switchable magnetic flux source including a first permanent magnet surrounding a first ferromagnetic core and a second permanent magnet surrounding a second ferromagnetic core. In a variation thereof, the first permanent magnet and the first ferromagnetic core are rotatable about a first axis and the second permanent magnet and the second ferromagnetic core are rotatable about a second axis, the second axis being spaced apart from the first axis. In a further variation thereof, the first axis is parallel to the second axis. In still a further variation thereof, the second pole portion is positioned between the first pole portion and the third pole portion and the second pole portion is positioned between the first axis and the second axis. In a further still variation thereof, the second pole portion is a common pole of the first permanent magnet and the second permanent magnet when the switchable magnetic flux source is in the ON state. In yet still a further variation thereof, a common actuator actuates the first permanent magnet and the first ferromagnetic core between at least the OFF state and the ON state and actuates the second permanent magnet and the second ferromagnetic core between at least the OFF state and the ON state. In yet still a further variation thereof, the common actuator simultaneously actuates the first permanent magnet and the first ferromagnetic core between at least the OFF state and the ON state and actuates the second permanent magnet and the second ferromagnetic core between at least the OFF state and the ON state.

In a further still example thereof, the at least one ferromagnetic core includes at least one channel. In a variation thereof, the at least one channel may receive one or more sensors, stationary pins, retractable pins, probes, and/or additional tools.

In yet a further example thereof, the magnetic coupling device further comprises a monitoring system including one or more sensors which monitor a characteristic of the magnetic coupling device.

In yet still a further example thereof, the magnetic coupling device further comprises a monitoring system including one or more sensors which monitor a characteristic of a magnetic circuit formed between magnetic coupling device and the ferromagnetic workpiece.

In still yet a further example thereof, the magnetic coupling device further comprises a proximity sensor to detect a proximity to the ferromagnetic workpiece.

In yet still a further example thereof, the switchable magnetic flux source being further switchable to at least one partial ON state, the partial ON state has a first strength of a magnetic circuit formed through ferromagnetic workpiece which is more than a second strength of the magnetic circuit formed through the ferromagnetic workpiece when the switchable magnetic flux source is in the OFF state and which is less than a third strength of the magnetic circuit formed through the ferromagnetic workpiece when the switchable magnetic flux source is in the ON state.

In a further example thereof, the magnetic coupling device further comprising an actuator, the actuator being a manual actuator, a hydraulic actuator, a pneumatic actuator, a mechanical actuator, an electrically controlled actuator, or a combination thereof.

In another example thereof, the at least one permanent magnet includes at least one electro-permanent magnet.

In yet still another example thereof, the at least one permanent magnet includes at least one rare earth permanent magnet.

Other aspects and optional and/or preferred embodiments will become apparent from the following description provided below with reference to the accompanying drawings.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

DETAILED DESCRIPTION OF THE DRAWINGS

Figures 1, 2:
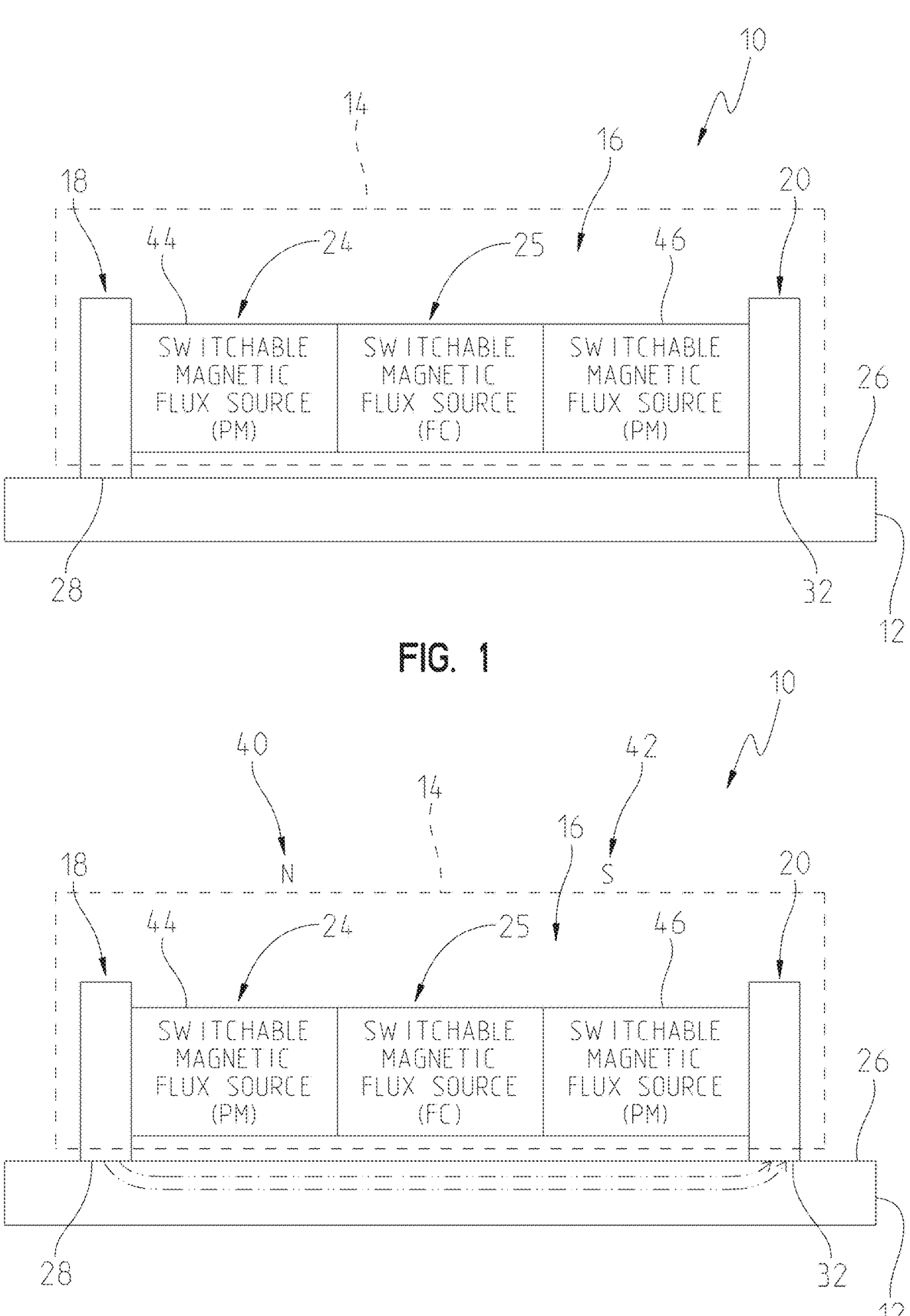
FIG. 1 illustrates a representative view of an exemplary magnetic coupling device having multiple workpiece contact interfaces and a switchable magnetic flux source including at least one permanent magnet and at least one ferromagnetic core.
FIG. 2 illustrates the magnetic coupling device of FIG. 1 with the magnetic coupling device in an ON state.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an exemplary magnetic coupling tool 10 is shown. Magnetic coupling device 10 is configured to magnetically couple a ferromagnetic workpiece 12. Magnetic coupling device 10 includes a housing 14, a switchable magnetic flux source 16, a first north pole portion 18, and a first south pole portion 20. First north pole portion 18 includes a workpiece interface 28 and first south pole portion 20 includes a workpiece interface 32, each of which contacts a respective part of ferromagnetic workpiece 12, illustratively a surface 26 of ferromagnetic workpiece 12. Each of workpiece interface 28 and workpiece interface 32 include at least one workpiece engagement surface. Workpiece interface 28 and workpiece interface 32 may each be planar, curved, contoured, have a plurality of spaced apart projections, or any other suitable shape for contacting ferromagnetic workpiece 12. Each of first north pole portion 18 and first south pole portion 20 are made of a ferromagnetic material and may be a part of housing 14 or separate components coupled to housing 14.

Switchable magnetic flux source 16 of magnetic coupling tool 10 is switchable between an OFF state wherein a magnetic circuit is formed within housing 14 or otherwise nonexistent and an ON state wherein a magnetic circuit is formed from switchable magnetic flux source 16 through workpiece interface 28 of magnetic coupling tool 10, through ferromagnetic workpiece 12, through workpiece interface 32 of magnetic coupling tool 10, and back to switchable magnetic flux source 16 (as represented by the arrows shown in FIG. 2). In embodiments, switchable magnetic flux source 16 may be placed in at least one partial ON state wherein the strength of the magnetic circuit formed through ferromagnetic workpiece 12 is more than the OFF state and less than the ON state.

Switchable magnetic flux source 16 includes a first portion 24 including at least one permanent magnet (PM) and a second portion 25 including at least one ferromagnetic core. First portion 24 may include multiple permanent magnets and is configurable to have an overall north pole portion 44 and an overall south pole portion 46. As shown in FIG. 2, overall north pole portion 44 of switchable magnetic flux source 16 is positioned proximate, and preferably contacting, first north pole portion 18 and overall south pole portion 46 of switchable magnetic flux source 16 is positioned proximate, and preferably contacting, first south pole portion 20. Overall north pole portion 44 of switchable magnetic flux source 16 is magnetically coupled with first north pole portion 18 resulting in workpiece interface 28 of first north pole portion 18 forming an overall north pole 40 of magnetic coupling tool 10. Overall south pole portion 46 is magnetically coupled with first south pole portion 20 resulting in workpiece interface 32 of first south pole portion 20 forming an overall south pole 42 of magnetic coupling tool 10.

First portion 24 of switchable magnetic flux source 16 may include one or more permanent magnets and is configurable to have an overall north pole portion 44 and an overall south pole portion 46. In embodiments, first portion 24 of switchable magnetic flux source 16 includes at least one electro-permanent magnet which is switchable between an ON state (having a north pole and a south pole) and an OFF state (not magnetized relative to external objects). Further, the at least one electro-permanent magnet may be configured to have varying magnetic strengths which allow the device to be configured in a partial ON state having a magnetic strength at workpiece interfaces 28 and 32 less than the ON state and greater than an OFF state. In embodiments, first portion 24 of switchable magnetic flux source 16 includes at least one rare earth permanent magnet and at least one electro-permanent magnet, the combination of which is switchable between an ON state having a magnetic strength at workpiece interfaces 28 and 32 and an OFF state wherein a magnetic circuit is formed internally to housing 14. Further, the combination may be configured to have varying magnetic strengths which allow the device to be configured in a partial ON state having a magnetic strength at workpiece interfaces 28 and 32 less than the ON state and greater than an OFF state. In embodiments, first portion 24 of switchable magnetic flux source 16 includes a plurality of rare earth permanent magnets, the combination of which is switchable between an ON state having a magnetic strength at workpiece interfaces 28 and 32 and an OFF state wherein a magnetic circuit is formed internally to housing 14. Further, the combination may be configured to have varying magnetic strengths which allow the device to be configured in a partial ON state having a magnetic strength at workpiece interfaces 28 and 32 less than the ON state and greater than an OFF state. In embodiments, first portion 24 of switchable magnetic flux source 16 includes at least one rare earth permanent magnet which is moveable relative to the housing 14 to thus be switchable between an ON state having a magnetic strength at workpiece interfaces 28 and 32 and an OFF state wherein a magnetic circuit is formed internally to housing 14.

Second portion 25 of switchable magnetic flux source 16 may include one or more ferromagnetic cores. In embodiments, the number of permanent magnets in first portion 24 of switchable magnetic flux source 16 is equal to the number of ferromagnetic cores in second portion 25 of switchable magnetic flux source 16. In embodiments, the number of permanent magnets in first portion 24 of switchable magnetic flux source 16 is not equal to the number of ferromagnetic cores in second portion 25 of switchable magnetic flux source 16. In embodiments, the number of permanent magnets in first portion 24 of switchable magnetic flux source 16 is greater than the number of ferromagnetic cores in second portion 25 of switchable magnetic flux source 16. In embodiments, the number of permanent magnets in first portion 24 of switchable magnetic flux source 16 is less than the number of ferromagnetic cores in second portion 25 of switchable magnetic flux source 16.

In embodiments, second portion 25 of switchable magnetic flux source 16 is in contact with first portion 24 of switchable magnetic flux source 16. The one or more permanent magnets of first portion 24 of f16 may surround a perimeter of the one or more ferromagnetic cores of second portion 25 of switchable magnetic flux source 16.

Figure 3:
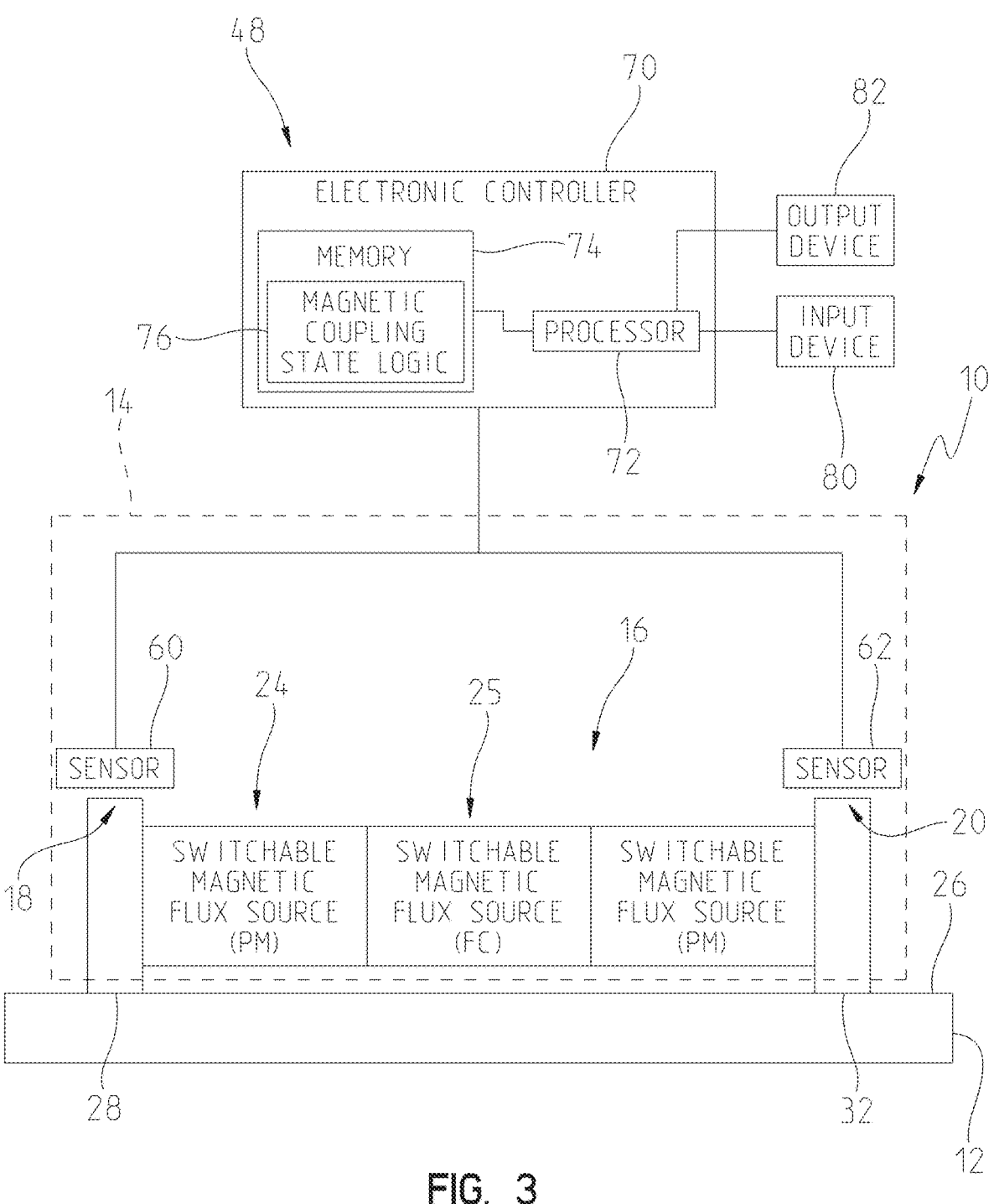
FIG. 3 illustrates the magnetic coupling device of FIG. 1 with a sensing system.

Referring to FIG. 3, in embodiments, magnetic coupling tool 10 further includes a monitoring system 48 including one or more sensors which monitor a characteristic of magnetic coupling tool 10 and/or a characteristic of a magnetic circuit formed between magnetic coupling tool 10 and ferromagnetic workpiece 12. As shown in FIG. 3, a first sensor 60 may be positioned proximate first north pole portion 18 and a second sensor 62 may be positioned proximate first south pole portion 20. Each of first sensor 60 and second sensor 62 may be a magnetic flux sensor. Additional types of sensors include temperature sensors which are used to compensate for temperature dependent drift in the magnetic flux sensors. Additionally, the positions of sensors 60 and 62 are exemplary and one or sensors may be positioned at different locations. In embodiments, a proximity sensor is provided to detect the proximity of the workpiece interfaces 28 and 32 to ferromagnetic workpiece 12. Exemplary proximity sensors include inductive sensors, ultrasound sensors, photonic sensors, cameras, and other suitable sensors. In embodiments, magnetic flux sensors may also be used to detect proximity to ferromagnetic workpiece 12 such as disclosed in U.S. Pat. No. 10,903,030, titled VARIABLE FIELD MAGNETIC COUPLERS AND METHODS FOR ENGAGING A FERROMAGNETIC WORKPIECE, the entire disclosure of which is expressly incorporated herein by reference.

Each of sensors 60 and 62 are operatively coupled to an electronic controller 70. Electronic controller 70 includes at least one processor 72 and associated memory 74. Memory 74 includes magnetic coupling state logic 76, logic control circuit, which monitors the output of sensors 60 and 62 to determine one or more characteristics of magnetic coupling tool 10 and/or one or more characteristics of a magnetic circuit formed between magnetic coupling tool 10 and ferromagnetic workpiece 12. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 70 is not microprocessor-based, but rather is configured to control operation of magnetic coupling device 10 based on one or more sets of hardwired instructions. Further, electronic controller 70 may be contained within a single device or be a plurality of devices networked together or otherwise electrically connected to provide the functionality described herein.

Electronic controller 70 may further receive input through one or more input devices 80. Exemplary input devices include buttons, switches, levers, dials, touch displays, soft keys, and a communication module. Electronic controller 70 may further provide output through one or more output devices 82. Exemplary output devices include visual indicators, audio indicators, and a communication module. Exemplary visual indicators include displays, lights, and other visual systems. Exemplary audio indicators include speakers and other suitable audio systems.

Figure 4A:
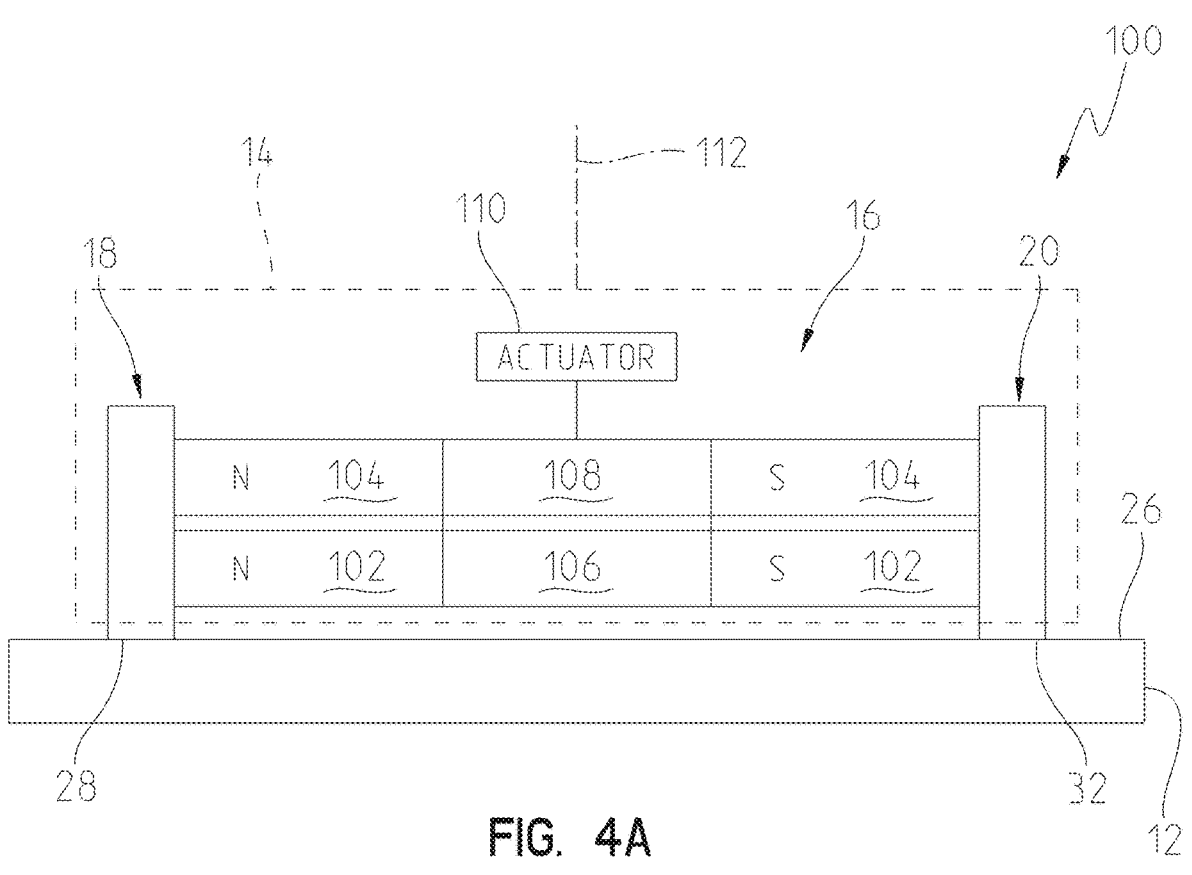
FIG. 4A illustrates a representative view of an exemplary magnetic coupling device having multiple workpiece contact interfaces, the magnetic coupling device including a stack of permanent magnets and ferromagnetic cores with a first permanent magnet moveable relative to a second permanent magnet with an actuator.

Referring to FIG. 4A, an exemplary embodiment of magnetic coupling device 10 is shown, illustratively magnetic coupling device 100. Magnetic coupling device 100 includes a switchable magnetic flux source 16 having a first permanent magnet 102, a second permanent magnet 104, a first ferromagnetic core 106, and a second ferromagnetic core 108. Each of first ferromagnetic core 106 and second ferromagnetic core 108 are made of ferromagnetic materials resulting in the magnetic flux of first permanent magnet 102 passing through first ferromagnetic core 106 and the magnetic flux of second permanent magnet 104 passing through second ferromagnetic core 108. Exemplary ferromagnetic materials include steel, iron, and other suitable materials.

Second permanent magnet 104 is spaced apart from first permanent magnet 102. In embodiments, a spacer (not shown) is positioned between first permanent magnet 102 and second permanent magnet 104. In embodiments, each of first permanent magnet 102 and second permanent magnet 104 are rare earth permanent magnets.

Figure 5:
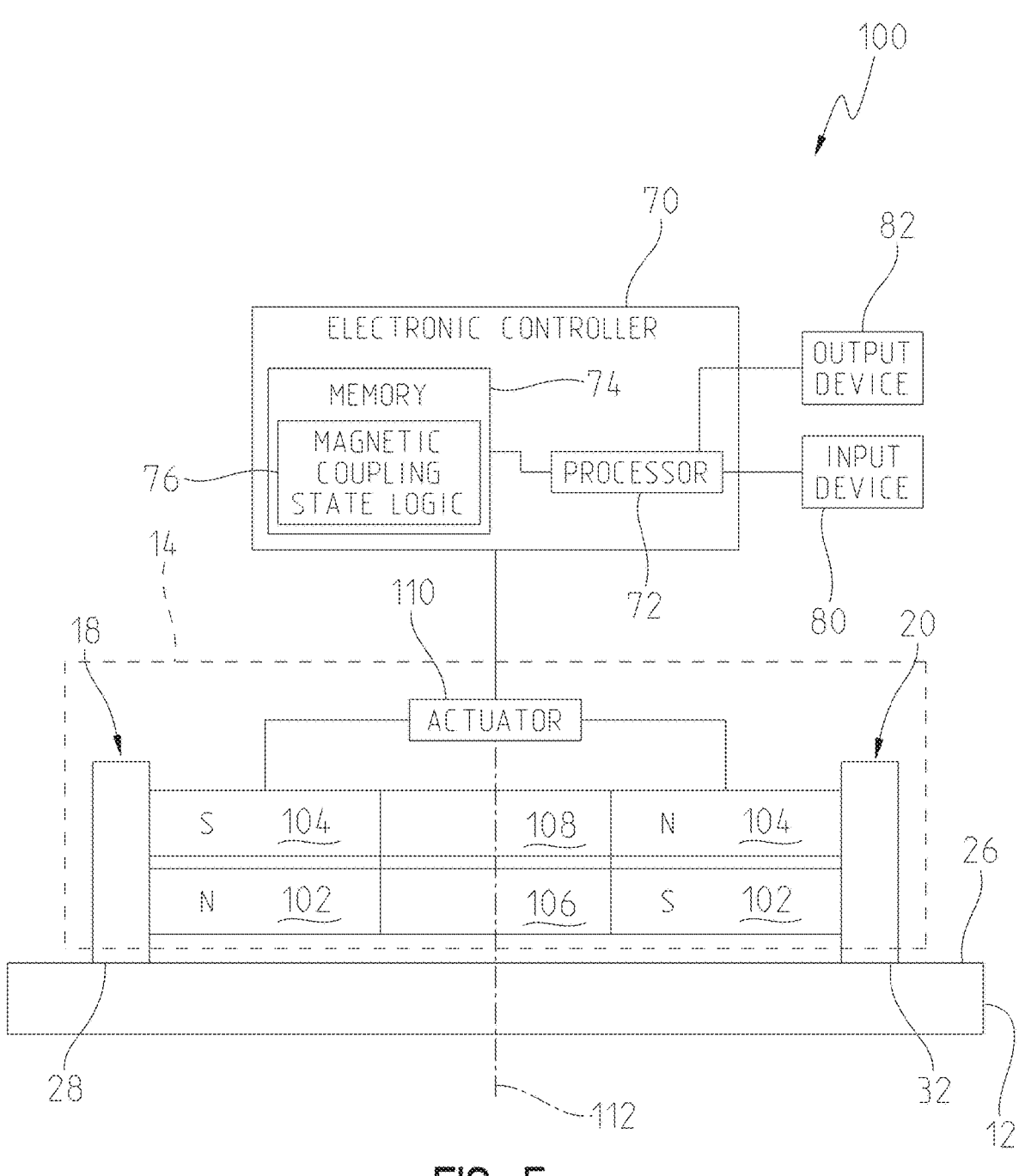
FIG. 5 illustrates the magnetic coupling device of FIG. 4A including an electronic controller operatively coupled to the actuator.

Second permanent magnet 104 is moveable relative to first permanent magnet 102. Magnetic coupling device 100 includes an actuator 110 which positions second permanent magnet 104 relative to first permanent magnet 102. Exemplary actuators 110 include manual actuators, hydraulic actuators, pneumatic actuators, mechanical actuators, electrically controlled actuators, and combinations thereof. Referring to FIG. 5, actuator 110 is an electrically controlled actuator and includes a motor (not shown) which is controlled by electronic controller 70 to position second permanent magnet 104 relative to first permanent magnet 102. Exemplary actuators are disclosed in U.S. Pat. No. 10,903,030, titled VARIABLE FIELD MAGNETIC COUPLERS AND METHODS FOR ENGAGING A FERROMAGNETIC WORKPIECE, the entire disclosure of which is expressly incorporated herein by reference.

In embodiments, actuator 110 rotates second permanent magnet 104 relative to first permanent magnet 102 about a rotational axis 112. First permanent magnet 102 is held fixed relative to housing 14. Workpiece interface 28 of first north pole portion 18 and workpiece interface 32 of first south pole portion 20 are magnetically coupled to first permanent magnet 102 and second permanent magnet 104. In embodiments, one or both of first permanent magnet 102 and second permanent magnet 104 are comprised of a single rare earth magnet. In embodiments, one or both of first permanent magnet 102 and second permanent magnet 104 are comprised of multiple rare earth magnets that collectively form the respective first permanent magnet 102 or second permanent magnet 104.

In one position of second permanent magnet 104 relative to first permanent magnet 102, a north pole of second permanent magnet 104 is generally aligned with a north pole of first permanent magnet 102 and a south pole of second permanent magnet 104 is generally aligned with a south pole of first permanent magnet 102, as shown in FIG. 4A. This configuration corresponds to magnetic coupling device 100 being in an ON state with workpiece interface 28 of first north pole portion 18 corresponding to an external north pole of magnetic coupling device 100 and workpiece interface 32 of first south pole portion 20 corresponding to an external south pole of magnetic coupling device 100. In the ON state, when magnetic coupling device 100 is in contact with ferromagnetic workpiece 12, a magnetic circuit is formed to magnetically couple ferromagnetic workpiece 12 to magnetic coupling device 100.

In another position of second permanent magnet 104 relative to first permanent magnet 102, a north pole of second permanent magnet 104 is generally aligned with a south pole of first permanent magnet 102 and a south pole of second permanent magnet 104 is generally aligned with a north pole of first permanent magnet 102, as shown in FIG. 5. This configuration corresponds to magnetic coupling device 100 being in an OFF state and a magnetic circuit is formed generally within housing 14; magnetic coupling device 100 lacks an external north pole at workpiece interface 28 of first north pole portion 18 and an external south pole at workpiece interface 32 of first south pole portion 20. In the OFF state, ferromagnetic workpiece 12 is not magnetically coupled to magnetic coupling device 100.

Actuator 110 rotates second permanent magnet 104 about rotational axis 112 to move second permanent magnet 104 between the positions shown in FIG. 4A and FIG. 5. In embodiments, actuator 110 is indirectly coupled to second permanent magnet 104 by coupling to second ferromagnetic core 108 which in turn is coupled to second permanent magnet 104. An advantage, among others, of actuator 110 being indirectly coupled to second permanent magnet 104 is that attachment features, such as recesses, holes, protrusions, and combinations thereof, do not need to be formed in or on second permanent magnet 104. In embodiments, actuator 110 is coupled directly to second permanent magnet 104. In embodiments, actuator 110 is coupled directly to each of second permanent magnet 104 and second ferromagnetic core 108.

In embodiments, actuator 110 is able to position second permanent magnet 104 at rotational positions between those shown in FIGS. 4A and 5. These intermediate rotational positions correspond to partial ON states of magnetic coupling device 100 with workpiece interface 28 of first north pole portion 18 corresponding to an external north pole of magnetic coupling device 100 and workpiece interface 32 of first south pole portion 20 corresponding to an external south pole of magnetic coupling device 100, but having a lower level of magnetic flux available at each of the external north pole and the external south pole. As such, magnetic coupling device 100 is able to be configured to provide a variable strength magnetic flux level to perform various operations, such as the operations disclosed in U.S. Pat. No. 10,903,030, titled VARIABLE FIELD MAGNETIC COUPLERS AND METHODS FOR ENGAGING A FERROMAGNETIC WORKPIECE, the entire disclosure of which is expressly incorporated herein by reference.

Figure 4B:
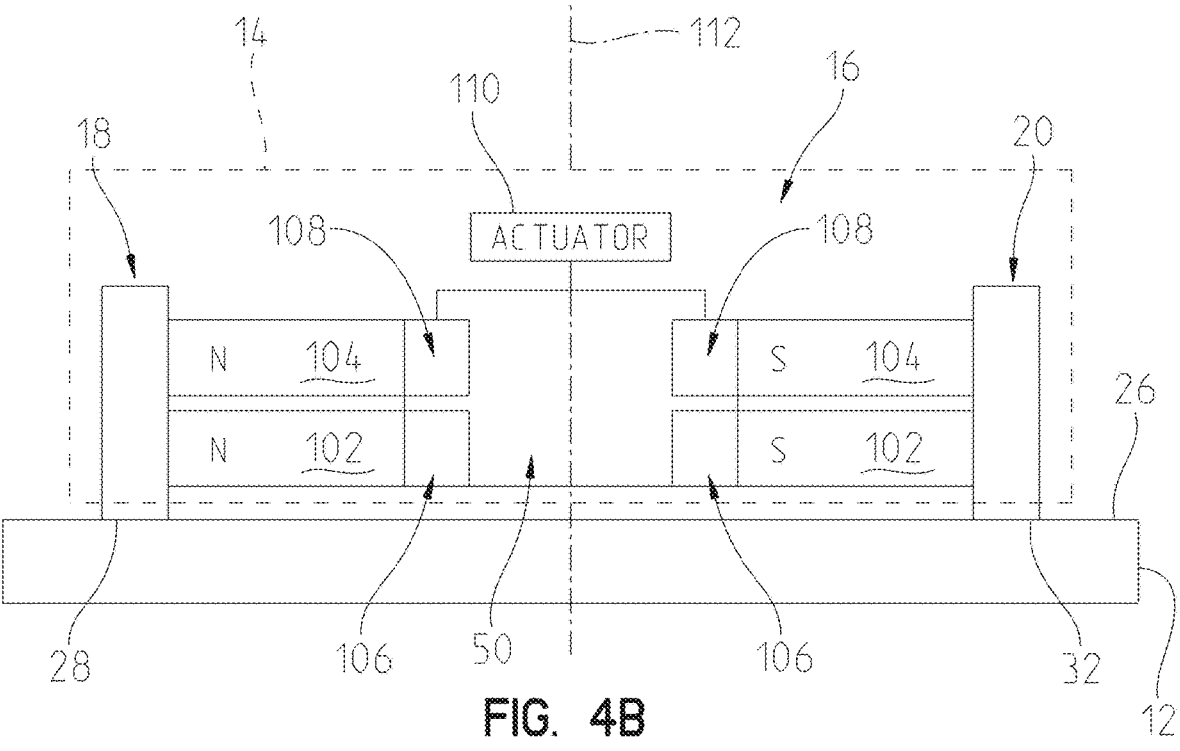
FIG. 4B illustrates the magnetic coupling device of FIG. 4A including a channel through the stack of ferromagnetic cores.

Referring to FIG. 4B, each of first ferromagnetic core 106 and second ferromagnetic core 108 have a through-opening which collectively form a channel 50. Channel 50 may receive one or more sensors, stationary pins, retractable pins, probes, and/or additional tools, such as described in PCT Patent Application No. PCT/US22/31286, filed May 27, 2022, titled MAGNETIC COUPLING DEVICE, the entire disclosure of which is expressly incorporated by reference herein.

Referring to FIG. 4A, switchable magnetic flux source 16 intersects rotational axis 112, illustratively both first ferromagnetic core 106 and second ferromagnetic core 108 intersect rotational axis 112. Referring to FIG. 4B, switchable magnetic flux source 16 does not intersect rotational axis 112, rather channel 50 intersects rotational axis 112. In both FIGS. 4A and 4B, first permanent magnet 102 and second permanent magnet 104 surround first ferromagnetic core 106 and second ferromagnetic core 108 respectively and are symmetrical about a plane containing rotational axis 112.

Figure 6:
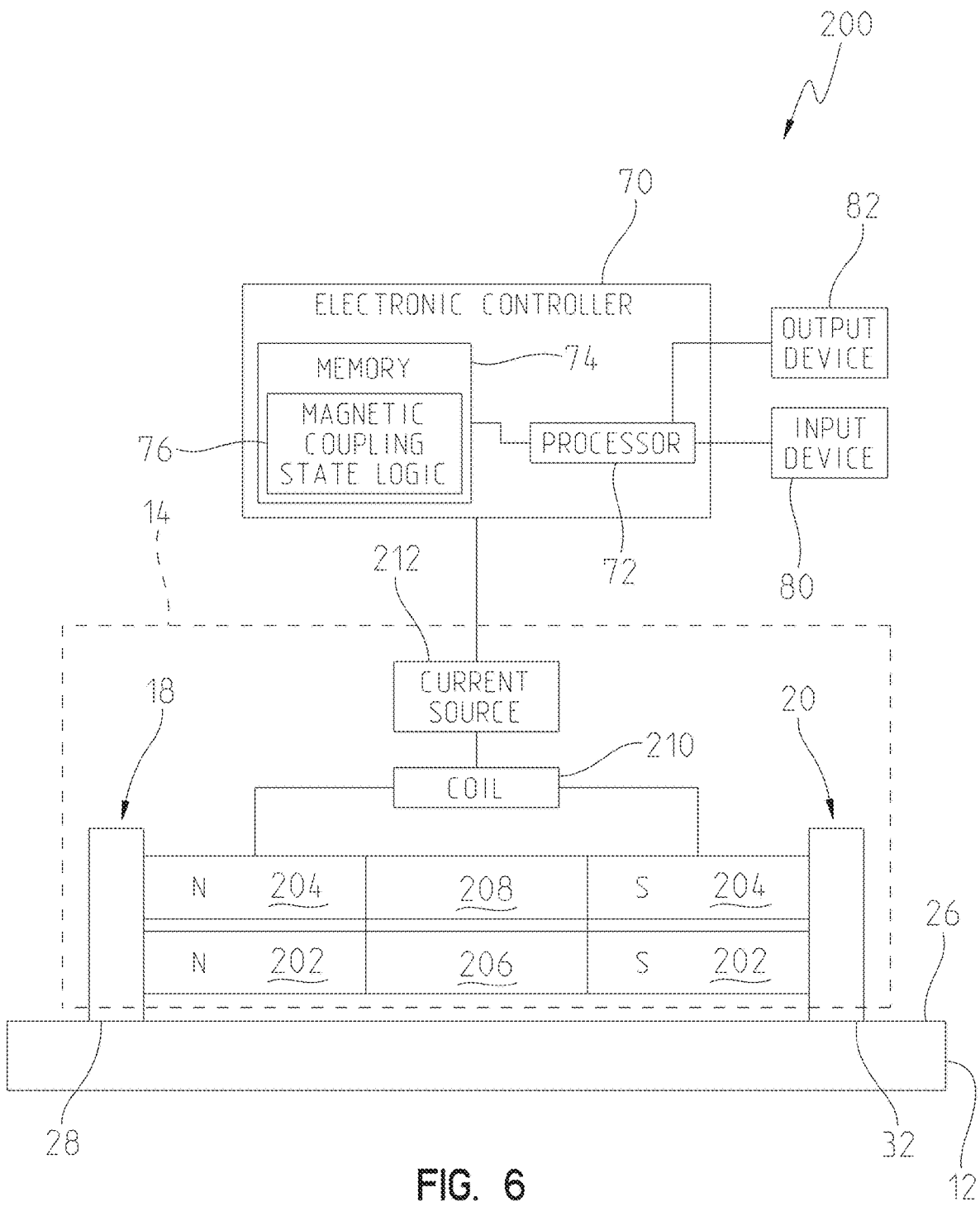
FIG. 6 illustrates a representative view of an exemplary magnetic coupling device having multiple workpiece contact interfaces, the magnetic coupling device including a stack of permanent magnets with a first electro-permanent magnet and a second permanent magnet.

Referring to FIG. 6, an exemplary embodiment of magnetic coupling device 10 is shown, illustratively magnetic coupling device 200. Magnetic coupling device 200 includes a switchable magnetic flux source 16 having a first permanent magnet 202, a first ferromagnetic core 206, a second permanent magnet 204, and a second ferromagnetic core 208. Second permanent magnet 204 and second ferromagnetic core 208 are spaced apart from first permanent magnet 202 and first ferromagnetic core 206. In embodiments, a spacer (not shown) is positioned between first permanent magnet 202 and second permanent magnet 204 or an air gap is maintained between first permanent magnet 202 and second permanent magnet 204. In embodiments, first permanent magnet 202 is a rare earth permanent magnet and second permanent magnet 204 is an electro-permanent magnet. First permanent magnet 202 and second permanent magnet 204 are held fixed relative to housing 14. Workpiece interface 28 of first north pole portion 18 and workpiece interface 32 of first south pole portion 20 are magnetically coupled to first permanent magnet 202 and second permanent magnet 204. In embodiments, first permanent magnet 202 and second permanent magnet 204 are both rare earth permanent magnets, first permanent magnet 202 is held fixed relative to housing 14, and second permanent magnet 204 is moveable relative to first permanent magnet.

At least a portion of second permanent magnet 204 is surrounded by a coil 210 which is coupled to a current source 212. A direction and strength of a current provided through coil 210 is controlled by electronic controller 70. The current is used to alter the pole positions for second permanent magnet 204. In embodiments, the current may be used to position a north pole of second permanent magnet 204 in general alignment with a north pole of first permanent magnet 202 and a south pole of second permanent magnet 204 is general alignment with a south pole of first permanent magnet 202, as shown in FIG. 6. The current does not need to be persistent to maintain second permanent magnet 204 in this configuration. This configuration corresponds to magnetic coupling device 200 being in an ON state with workpiece interface 28 of first north pole portion 18 corresponding to an external north pole of magnetic coupling device 200 and workpiece interface 32 of first south pole portion 20 corresponding to an external south pole of magnetic coupling device 200. In the ON state, when magnetic coupling device 200 is in contact with ferromagnetic workpiece 12, a magnetic circuit is formed to magnetically couple ferromagnetic workpiece 12 to magnetic coupling device 200. In embodiments, the magnetic mass of first permanent magnet 202 and second permanent magnet 204 may be different or the same. In embodiments, one or both of first permanent magnet 202 and second permanent magnet 204 are comprised of a permanent magnet. In embodiments, one or both of first permanent magnet 102 and second permanent magnet 104 are comprised of multiple permanent magnets that collectively form the respective first permanent magnet 102 or second permanent magnet 104.

In embodiments, the current may be used to position a north pole of second permanent magnet 204 in general alignment with a south pole of first permanent magnet 202 and a south pole of second permanent magnet 204 in general alignment with a north pole of first permanent magnet 202. This configuration corresponds to magnetic coupling device 200 being in an OFF state and a magnetic circuit is formed generally within housing 14; magnetic coupling device 200 lacks an external north pole at workpiece interface 28 of first north pole portion 18 and an external south pole at workpiece interface 32 of first south pole portion 20. In the OFF state, ferromagnetic workpiece 12 is not magnetically coupled to magnetic coupling device 200.

In embodiments, the electro permanent magnet of the second permanent magnet 204 may be charged to different levels to provide a variable magnetic strength at the workpiece interfaces 28 and 32. Thus, at least one partial ON state may be configured having a magnetic strength at the workpiece interfaces 28 and 32 being less than the ON state and greater than the OFF state. Exemplary electro-permanent magnets include AlNiCo electro-permanent magnets. Partial ON states may be achieved in embodiments wherein the second permanent magnet is a rare earth permanent magnet rotated by the current passing through coil 210 by causing a partial alignment between the north poles of the first permanent magnet 202 and the second permanent magnet 204.

Referring to FIGS. 7-11, an exemplary magnetic coupling device 300 is shown. Magnetic coupling device 300 is similar in structure to magnetic coupling device 100. Magnetic coupling device 300 includes a housing 302. Housing 302 is a multi-piece housing. Magnetic coupling device 300 includes an actuator assembly 304 and a magnet and pole piece assembly 306 with exemplary pole portions shown in phantom. The illustrated actuator assembly includes a pneumatic actuator. Other exemplary actuators may be used.

Figure 11:
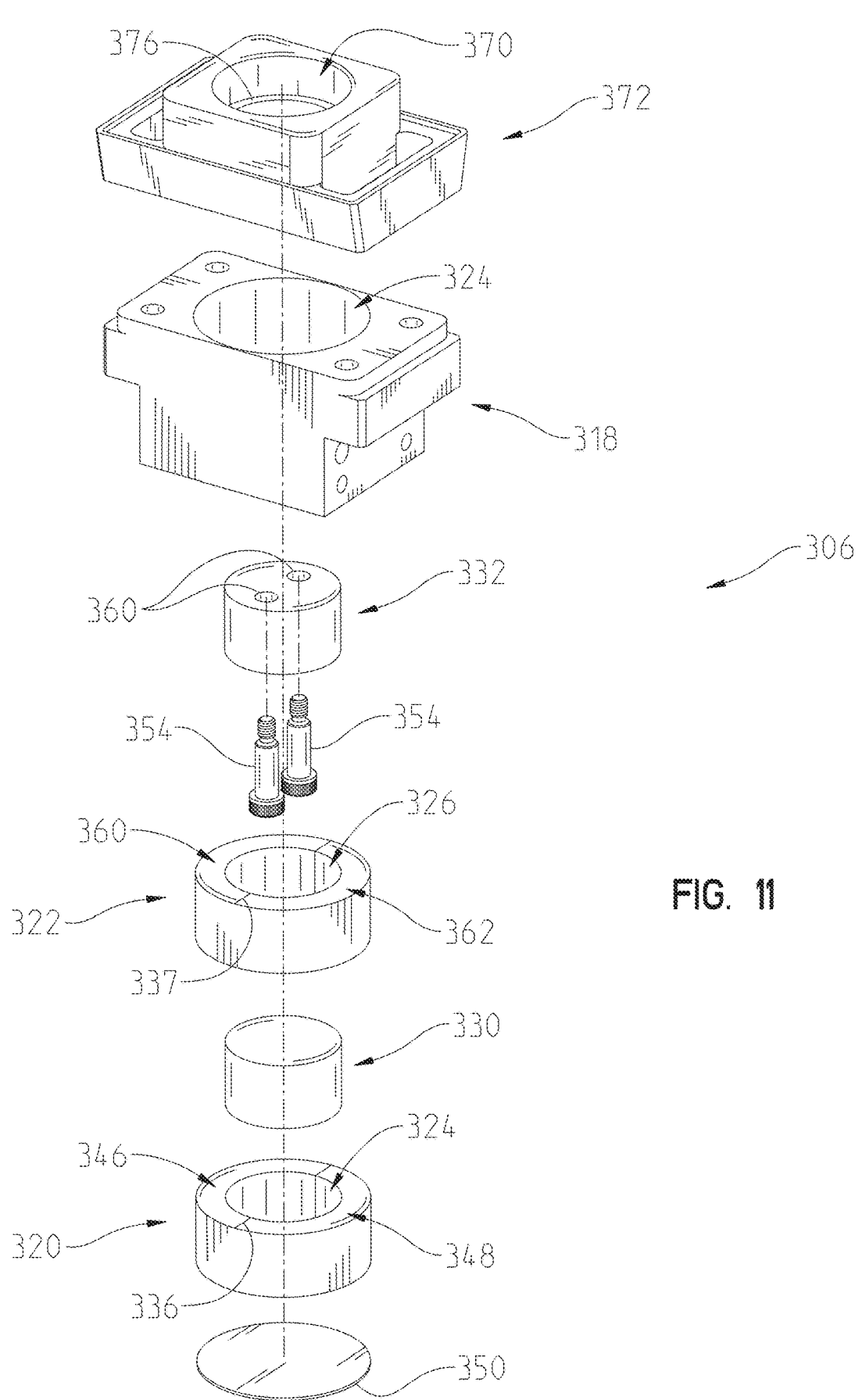
FIG. 11 illustrates an exploded view of portions of the exemplary magnetic coupling device of FIG. 8.

Referring to FIG. 11, magnet and pole piece assembly 306 includes a first permanent magnet 320 and a second permanent magnet 322. In the illustrated embodiment, each of first permanent magnet 320 and second permanent magnet 322 are rare earth permanent magnets. Each of first permanent magnet 320 and second permanent magnet 322 are ring magnets; first permanent magnet 320 includes an opening 324 and second permanent magnet 322 includes an opening 326.

Opening 324 of first permanent magnet 320 receives a first ferromagnetic core 330. Opening 326 of second permanent magnet 322 receives a second ferromagnetic core 332. First ferromagnetic core 330 is coupled to first permanent magnet 320 and second ferromagnetic core 332 is coupled to second permanent magnet 322. In embodiments, first ferromagnetic core 330 and second ferromagnetic core 332 are coupled to respective first permanent magnet 320 and second permanent magnet 322 by press fitting first ferromagnetic core 330 and second ferromagnetic core 332 into the respective opening 324 of first permanent magnet 320 and opening 326 of second permanent magnet 322. In embodiments, first ferromagnetic core 330 and second ferromagnetic core 332 are coupled to respective first permanent magnet 320 and second permanent magnet 322 through an adhesive between first ferromagnetic core 330 and first permanent magnet 320 and second ferromagnetic core 332 and second permanent magnet 322. Other suitable methods of coupling first ferromagnetic core 330 and second ferromagnetic core 332 to respective first permanent magnet 320 and second permanent magnet 322.

Figure 7:
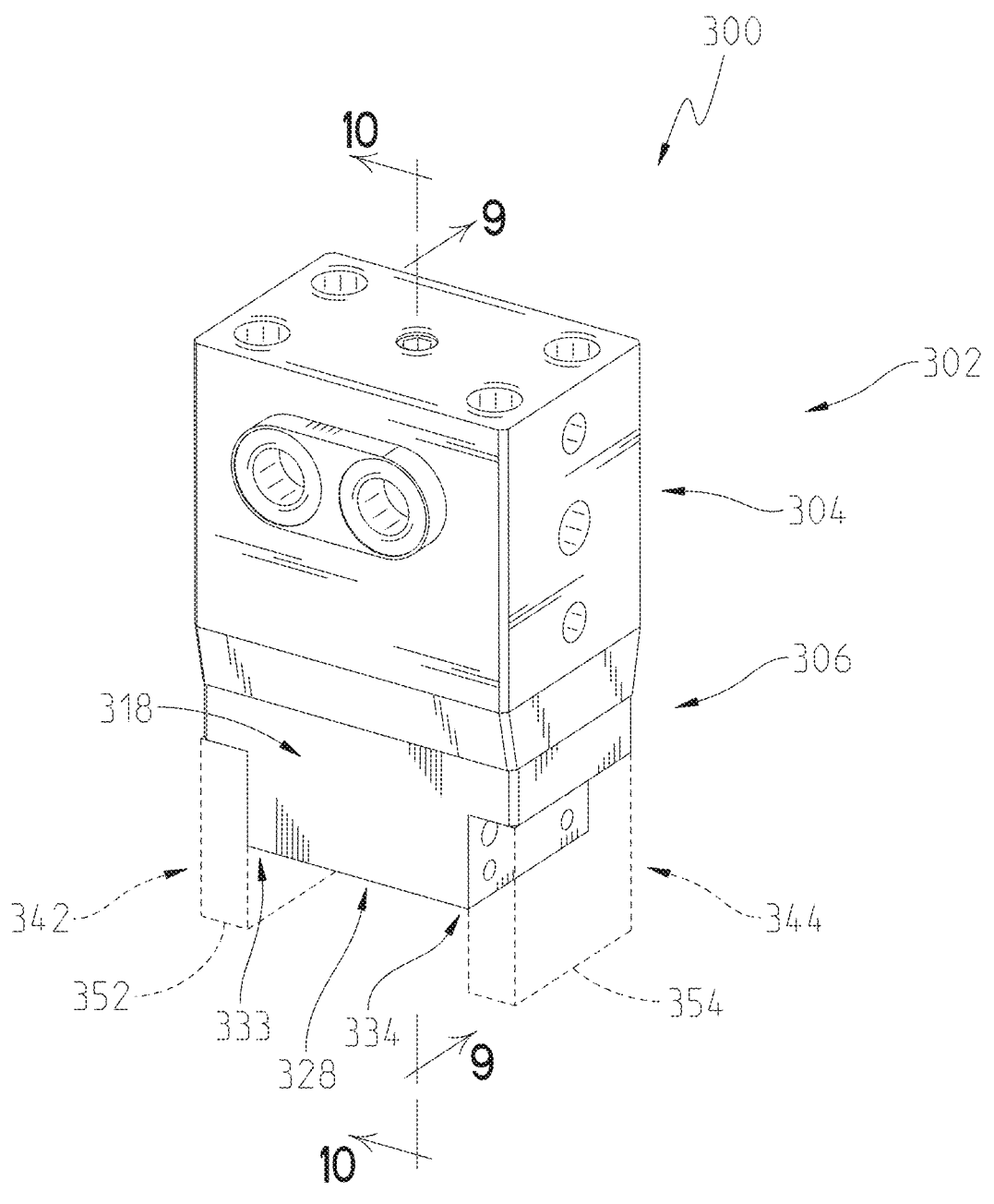
FIG. 7 illustrates a first upper perspective view of an exemplary magnetic coupling device in accordance with the magnetic coupling device of FIG. 4 having a pneumatic actuator and removable pole portions.
Figure 8:
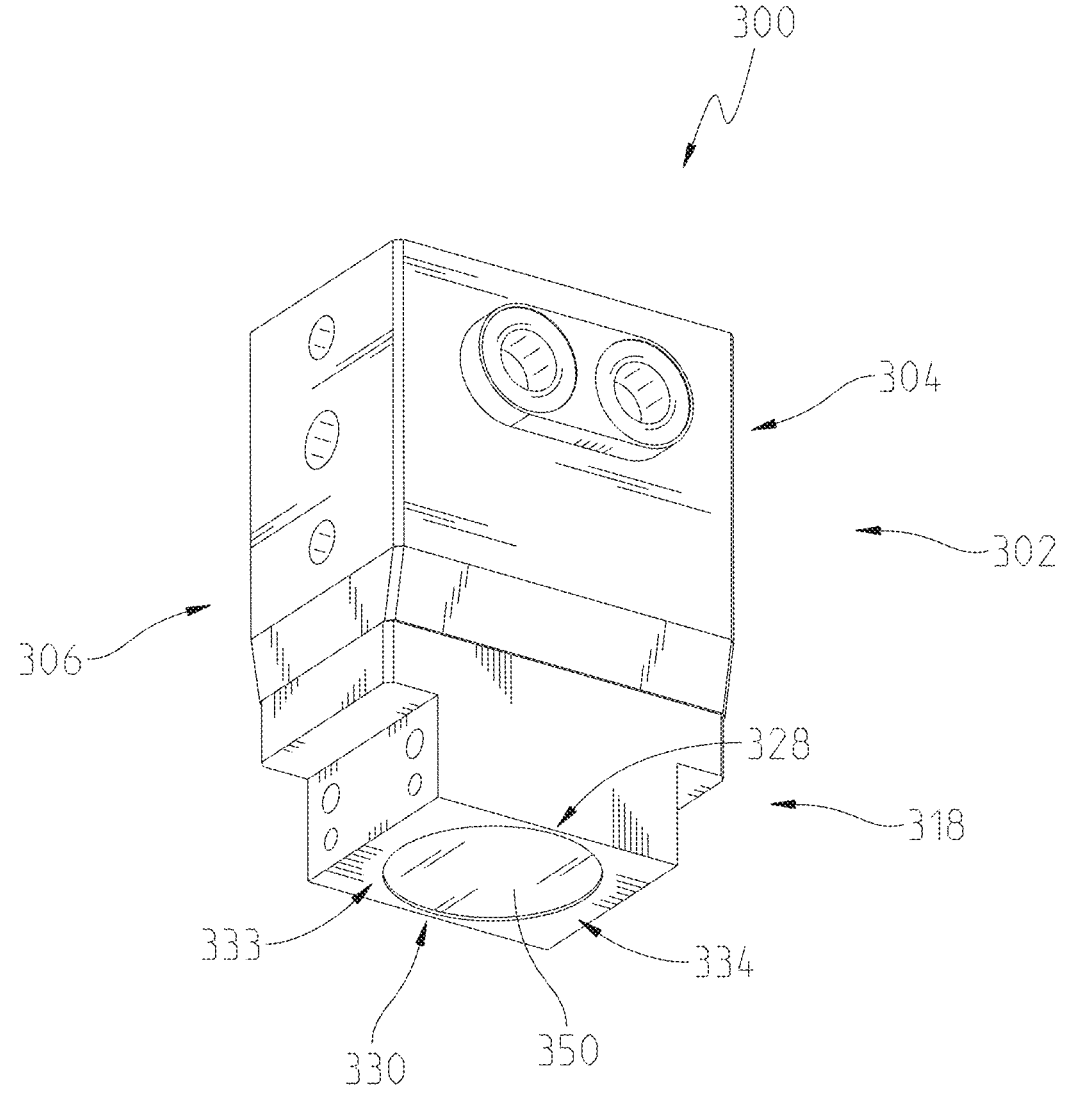
FIG. 8 illustrates a second perspective view of the magnetic coupling device of FIG. 7.
Figures 9, 10:
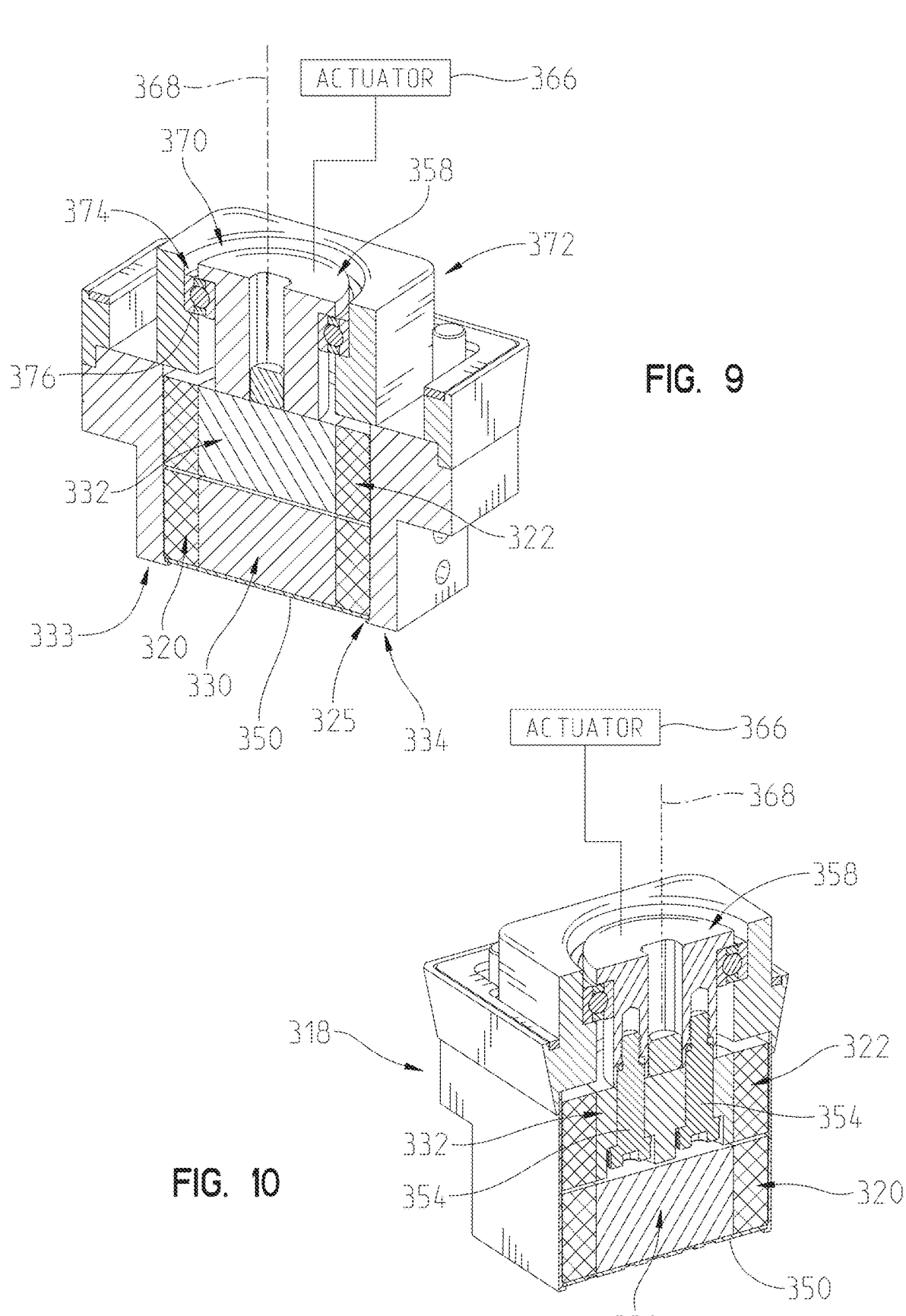
FIG. 9 illustrates a first sectional view of a portion of the magnetic coupling device of FIG. 8 along lines 9-9 in FIG. 8.
FIG. 10 illustrates a second sectional view of a portion of the magnetic coupling device of FIG. 8 along lines 10-10 in FIG. 8.

Magnet and pole piece assembly 306 includes a housing 318 having an opening 324 therethrough. Housing 318 is made of a ferromagnetic material. An exemplary ferromagnetic material is steel. An inwardly extending lip 325 (see FIG. 9) is provided at a lower portion of housing 318. Referring to FIG. 8, housing 318 is dimensioned such that only thin wall webs 328 and 330 connect a first thick walled housing portion 333 and a second thick walled housing portion 334. Each of first thick walled housing portion 333 and second thick walled housing portion 334 are coupled to respective pole portions 342 and 344 (see FIG. 7). In embodiments, housing 318 includes integral pole extensions. Referring to FIG. 7, pole portions 342 includes a workpiece engagement surface 352 and pole portions 344 includes a workpiece engagement surface 354. Referring to FIGS. 9-11, first permanent magnet 320 is secured in housing 318 with a N-S pole separation plane 336 extending (bridging) between thin wall webs 328, 330 resulting in a north pole portion 346 of first permanent magnet 320 being positioned adjacent first thick walled portion 333 of housing 318 and a south pole portion 348 of first permanent magnet 320 being positioned adjacent second thick walled housing portion 334 of housing 318.

Referring to FIG. 9, during assembly, a spacer 350 is received in opening 324 of housing 318 and is supported by lip 325 of housing 318. First permanent magnet 320 is supported by a spacer 350 and secured to housing 318. In embodiments, spacer 350 is non-ferromagnetic. In embodiments, spacer 350 is ferromagnetic. In embodiments, first permanent magnet 320 is secured to housing 318 with an adhesive, a mechanical interference, and/or a fastener.

Second permanent magnet 322 is also received in opening 324 of housing 318 and is rotatable relative to housing 318 and first permanent magnet 320 about an axis 368. Second permanent magnet 322 has a N-S pole separation plane 337 dividing a north pole portion 360 of second permanent magnet 322 and a south pole portion 362 of second permanent magnet 322.

A second non-ferromagnetic spacer may be placed on top of first permanent magnet 320 and separates second permanent magnet 322 from first permanent magnet 320. In the illustrated embodiment, second permanent magnet 322 is separated from first permanent magnet 320 due to second ferromagnetic core 332 being suspended from an actuator base 358 with fasteners 354 that are received in openings 360 in second ferromagnetic core 332. Actuator base 358 may be coupled to an actuator 366 which rotates actuator base 358 about axis 368. Exemplary actuators include an operator input, such as a knob, a motor, a pneumatic control element, a hydraulic control element, and other suitable actuators.

Actuator base 358 is received in an opening 370 of an actuator housing 372. Actuator base 358 is supported on a bearing 374 which is supported on a lip 376 of actuator housing 372 (see FIG. 9).

In embodiments, the outer diameter of first ferromagnetic core 330 has a value in the range of 30% to 80% of the outer diameter of first permanent magnet 320. In embodiments, the outer diameter of first ferromagnetic core 330 has a value in the range of 50% to 80% of the outer diameter of first permanent magnet 320. In embodiments, the outer diameter of first ferromagnetic core 330 has a value in the range of 50% to 70% of the outer diameter of first permanent magnet 320. In embodiments, the outer diameter of first ferromagnetic core 330 has a value of at least 30% of the outer diameter of first permanent magnet 320. In embodiments, the outer diameter of first ferromagnetic core 330 has a value of at least 50% of the outer diameter of first permanent magnet 320. In embodiments, the outer diameter of first ferromagnetic core 330 has a value of at least 60% of the outer diameter of first permanent magnet 320. In embodiments, the outer diameter of first ferromagnetic core 330 has a value of at least 70% of the outer diameter of first permanent magnet 320. In embodiments, the outer diameter of second ferromagnetic core 332 has a value equal to the outer diameter of first ferromagnetic core 330 and the outer diameter of second permanent magnet 322 has a value equal to the outer diameter of first permanent magnet 320.

Referring to FIG. 7, workpiece engagement surface 352 of pole portions 342 and workpiece engagement surface 354 of pole portions 344 are planar, parallel, and positioned in a common plane. In embodiments, the shape of each of workpiece engagement surface 352 of pole portions 342 and workpiece engagement surface 354 of pole portions 344 is contoured to a shape of ferromagnetic workpiece 12. Further, in embodiments, one or more of workpiece engagement surface 352 of pole portions 342 and workpiece engagement surface 354 of pole portions 344 include spaced apart projections, such as the projections disclosed in US Published Patent Application No. 20210031317, the entire disclosure of which is expressly incorporated by reference herein.

In embodiments, the side of housing 318 extending upward from thin web portion 328 and/or the side of housing 318 extending upward from thin web portion 330 may provide a workpiece engagement surface.

In embodiments, first permanent magnet 320 is positioned relative to housing 318 so that N-S pole separation plane 336 is generally aligned with thin wall webs 328 and first ferromagnetic core 330 of housing 318 resulting in north pole portion 346 of first permanent magnet 320 being positioned adjacent first thick walled portion 333 of housing 318 and south pole portion 348 of first permanent magnet 320 being positioned adjacent second thick walled housing portion 334 of housing 318. In one configuration of second permanent magnet 322 relative to first permanent magnet 320, north pole portion 360 of second permanent magnet 322 is generally aligned with north pole portion 346 of first permanent magnet 320 and south pole portion 362 of second permanent magnet 322 is generally aligned with south pole portion 348 of first permanent magnet 320. This configuration corresponds to magnetic coupling device 300 being in an ON state with workpiece engagement surface 352 of pole portions 342 corresponding to an external north pole of magnetic coupling device 300 and workpiece engagement surface 354 of pole portions 344 corresponding to an external south pole of magnetic coupling device 300. In the ON state, when magnetic coupling device 300 is in contact with ferromagnetic workpiece 12, a magnetic circuit is formed to magnetically couple ferromagnetic workpiece 12 to magnetic coupling device 300.

In another configuration of second permanent magnet 322 relative to first permanent magnet 320, north pole portion 360 of second permanent magnet 322 is generally aligned with south pole portion 348 of first permanent magnet 320 and south pole portion 362 of second permanent magnet 322 is generally aligned with north pole portion 346 of first permanent magnet 320. This configuration corresponds to magnetic coupling device 300 being in an OFF state and a magnetic circuit is formed generally within housing 318; magnetic coupling device 300 lacks an external north pole at workpiece engagement surface 352 of pole portions 342 and an external south pole at workpiece engagement surface 354 of workpiece engagement surface 352. In the OFF state, ferromagnetic workpiece 12 is not magnetically coupled to magnetic coupling device 300. As mentioned herein, an actuator 366 rotates second permanent magnet 322 about axis 368 to move second permanent magnet 322 relative to first permanent magnet 320. In embodiments, actuator 366 is able to position second permanent magnet 322 at rotational positions between the above described ON and OFF states. These intermediate rotational positions correspond to partial ON states of magnetic coupling device 300 with workpiece engagement surface 352 of pole portions 342 corresponding to an external north pole of magnetic coupling device 300 and workpiece engagement surface 354 of workpiece engagement surface 352 corresponding to an external south pole of magnetic coupling device 300, but having a lower level of magnetic flux available at each of the external north pole and the external south pole. As such, magnetic coupling device 300 is able to be configured to provide a variable strength magnetic flux level to perform various operations, such as the operations disclosed in U.S. Pat. No. 10,903,030, titled VARIABLE FIELD MAGNETIC COUPLERS AND METHODS FOR ENGAGING A FERROMAGNETIC WORKPIECE, the entire disclosures of which are expressly incorporated by reference herein.

In embodiments, at least one of first permanent magnet 320 and second permanent magnet 322 is an electro-permanent magnet and magnetic coupling device 300 is switchable between the ON state, one or more partial ON states, and the OFF state without moving either of first permanent magnet 320 and second permanent magnet 322, but by controlling the state of the one or more electro-permanent magnets. In embodiments, magnetic coupling device 300 includes first permanent magnet 320 and associated first ferromagnetic core 330, but not second permanent magnet 322 and associated second ferromagnetic core 332, and first permanent magnet 320 is an electro-permanent magnet resulting in magnetic coupling device 300 being switchable between the ON state, one or more partial ON states, and the OFF state by controlling the state of first permanent magnet 320.

In embodiments, magnetic coupling device 300 includes only first permanent magnet 320 and first ferromagnetic core 330 and both first permanent magnet 320 and first ferromagnetic core 330 are rotatable relative to housing 318 or includes both first permanent magnet 320 and first ferromagnetic core 330 and second permanent magnet 322 and second ferromagnetic core 332 and all of first permanent magnet 320, first ferromagnetic core 330, second permanent magnet 322, and second ferromagnetic core 332 are rotatable relative to housing 318. In either case, by positioning the magnet(s) such that the north pole portion is aligned with thick walled portion 333 and the south pole portion is aligned with thick walled portion 334 the device is in an ON state and by positioning the magnet(s) such that the north pole portion is aligned with thin web 328 and the south pole portion is aligned with thin web 330 the device is in an OFF state. Partial ON states may be established by positioning the magnets(s) between the positions for the ON state and the OFF state.

Figure 12:
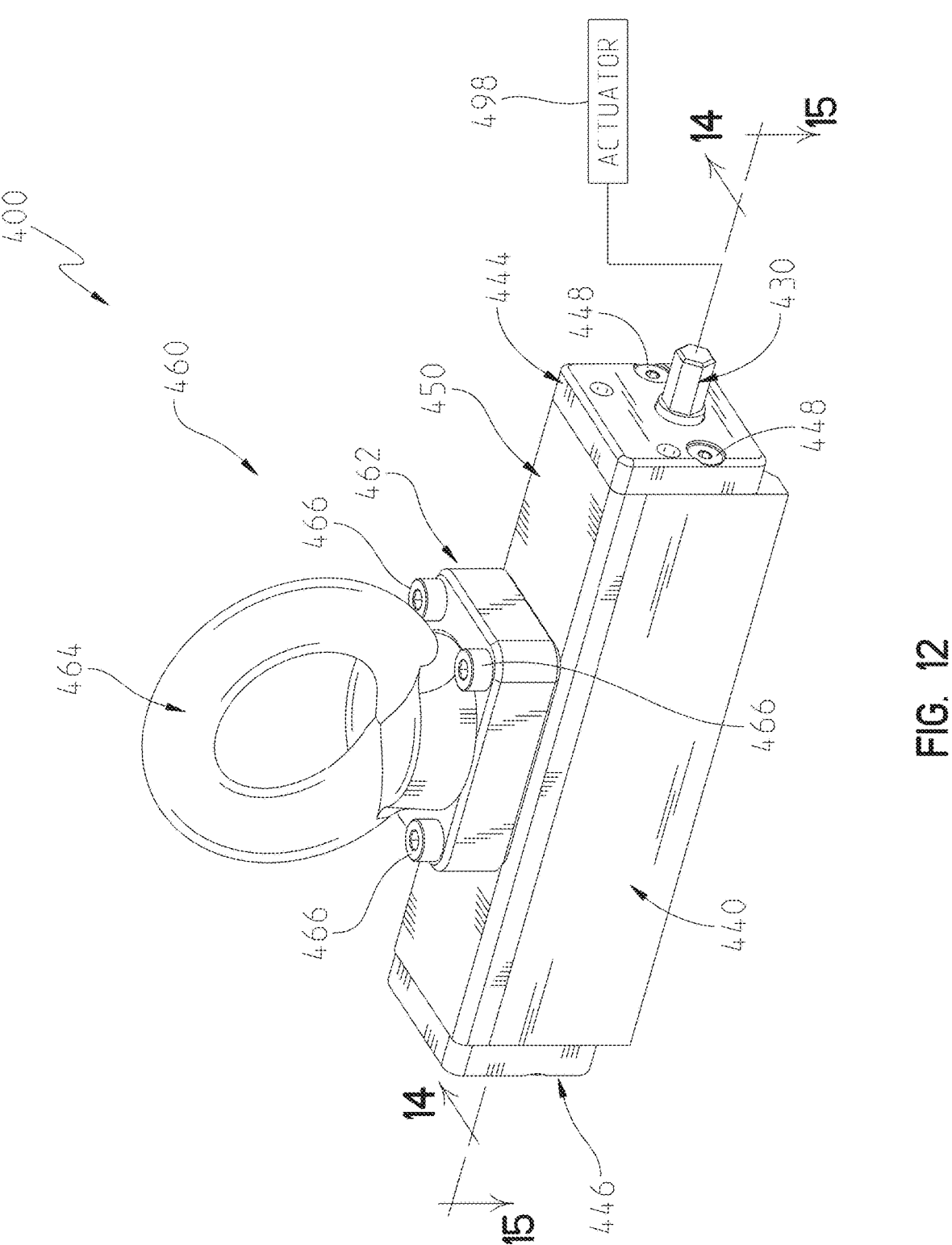
FIG. 12 illustrates an upper perspective view of a further exemplary magnetic coupling device.
Figure 13:
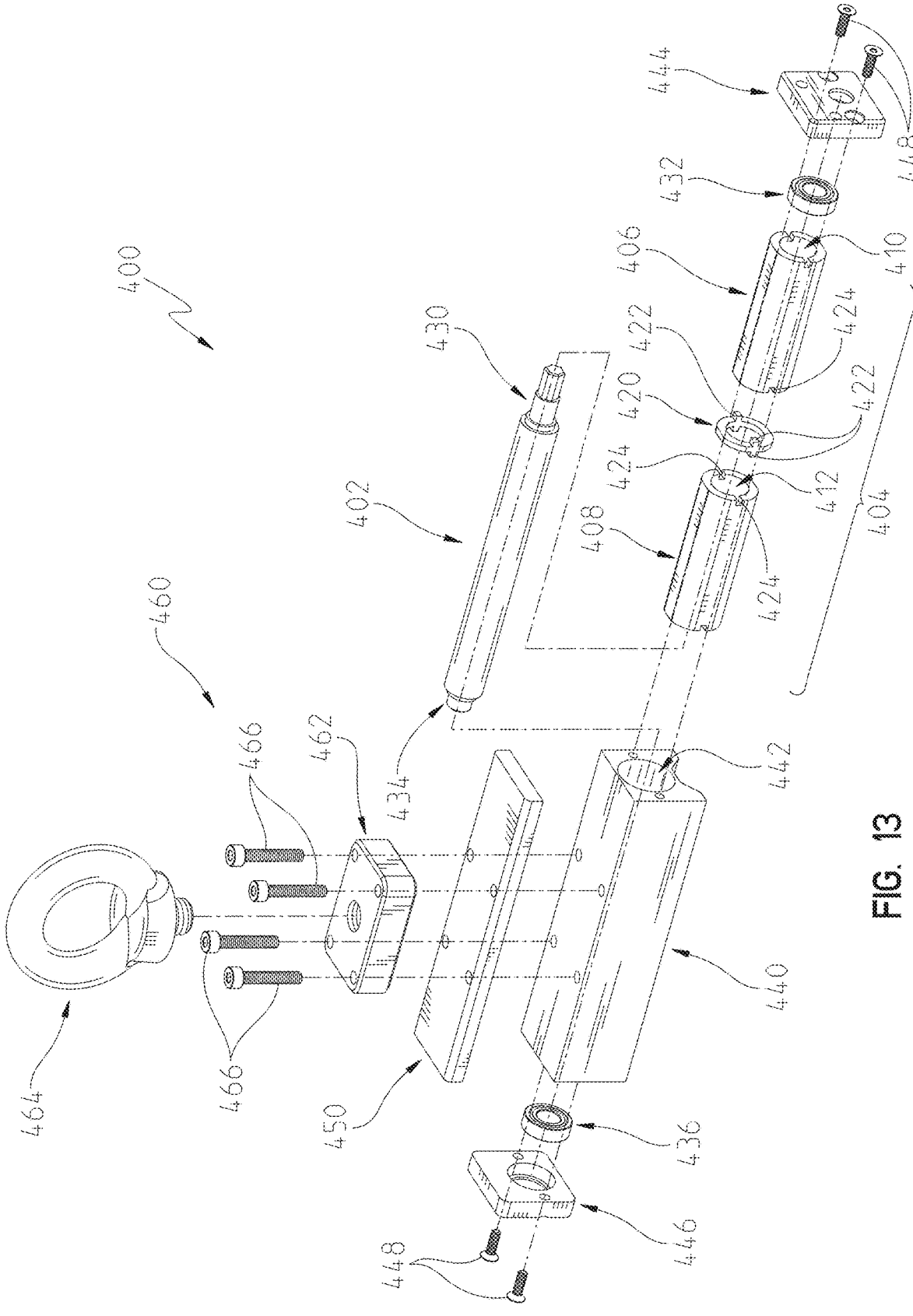
FIG. 13 illustrates an exploded view of the magnetic coupling device of FIG. 12.

Referring to FIGS. 12-17, another exemplary magnetic coupling device 400 is shown. Referring to FIG. 13, a ferromagnetic core 402 is provided. In the illustrated embodiment, ferromagnetic core 402 is a unitary core. In embodiments, ferromagnetic core 402 includes multiple components which collectively form ferromagnetic core 402. At least one permanent magnet 404 is provided. Illustratively, a first permanent magnet 406 and a second permanent magnet 408 are provided. In one embodiments, one or three or more permanent magnets 404 may be provided. Each of first permanent magnet 406 and second permanent magnet 408 are ring magnets and have a hollow interior 410, 412, respectively. A spacer 420 is provided between first permanent magnet 406 and second permanent magnet 408. In embodiments, spacer 420 is made from a non-ferromagnetic material. Spacer 420 key elements 422, illustratively protrusions, which cooperate with key elements 424 on first permanent magnet 406 and second permanent magnet 408, illustratively slots, to lock an orientation of second permanent magnet 408 relative to first permanent magnet 406.

Figure 14:
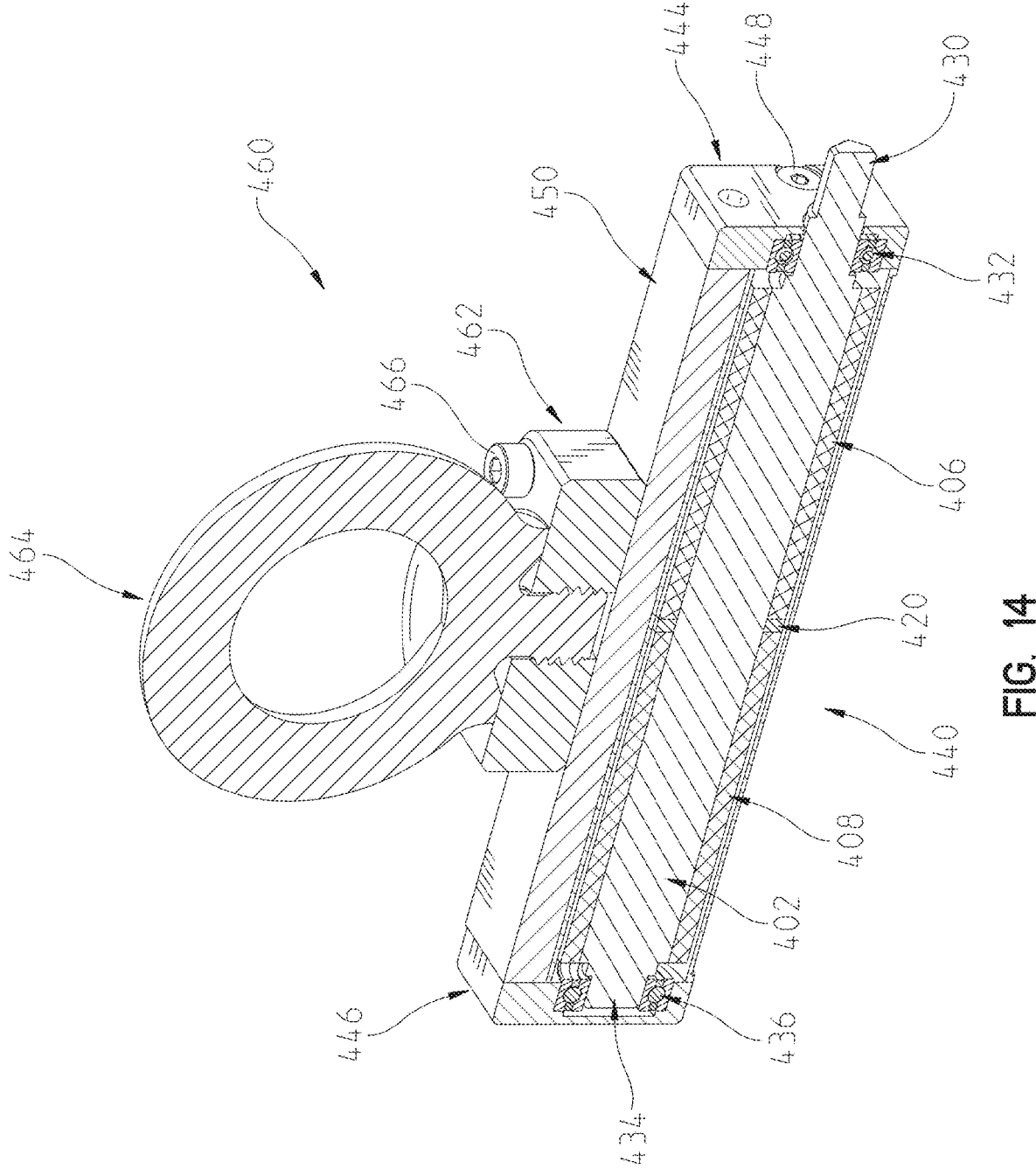
FIG. 14 illustrates a first sectional view of a portion of the magnetic coupling device of FIG. 12 along lines 14-14 in FIG. 12.
Figure 15:
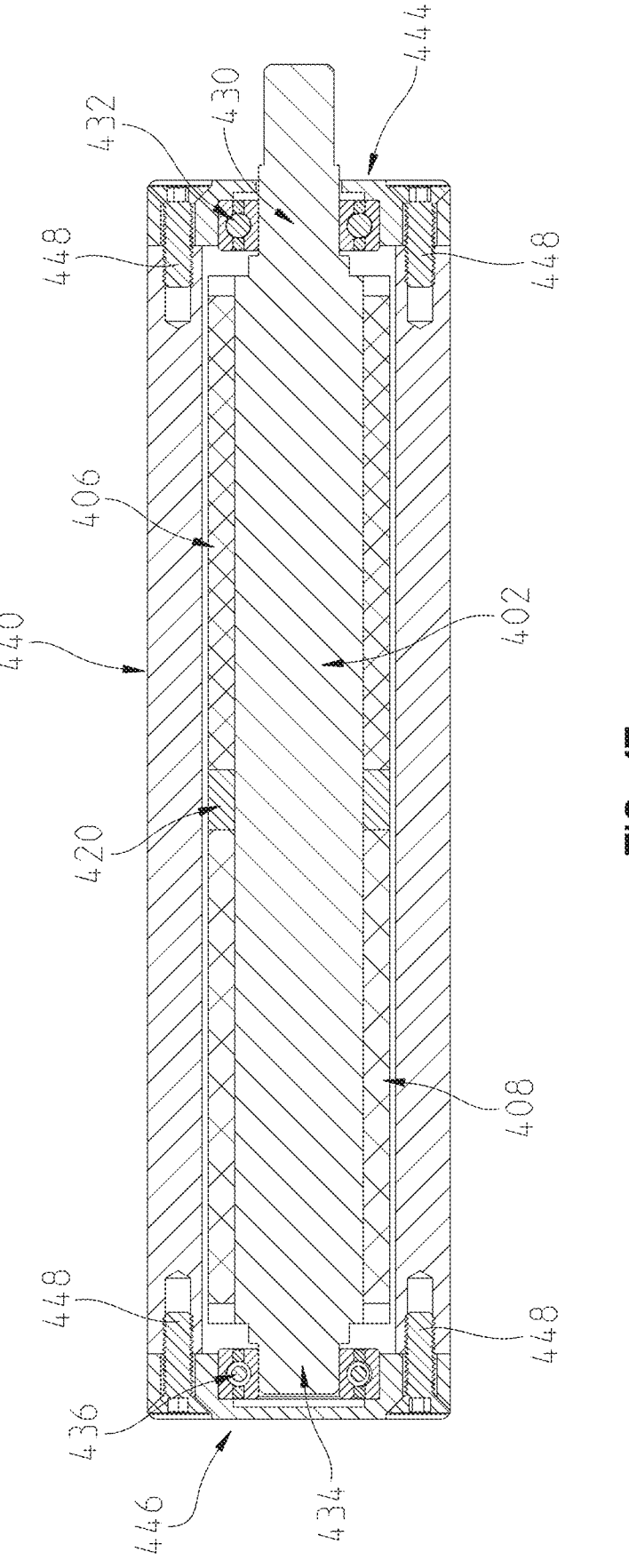
FIG. 15 illustrates a second sectional view of a portion of the magnetic coupling device of FIG. 12 along lines 15-15 in FIG. 12.

Ferromagnetic core 402 is received through interior 410 of first permanent magnet 406, spacer 420, and interior 412 of second permanent magnet 408 as shown in FIG. 14. A first end 430 of ferromagnetic core 402 receives a first bearing 432 and a second end 434 of ferromagnetic core 402 receives a second bearing 436. Ferromagnetic core 402 is received in an opening 442 in a housing 440. Housing 440 is made of a ferromagnetic material. An exemplary ferromagnetic material is steel. Bearings 432, 436 are supported by respective end caps 444, 446 (see FIGS. 14 and 15) which are secured to housing 440 with fasteners 448 which are threaded into housing 440. In embodiments, end caps 444, 446 are made of a non-ferromagnetic material.

In embodiments, a spacer 450 is provided (see FIGS. 12 and 13). Spacer plate 450 is used to couple a lifting eye assembly 460 to housing 440. Lifting eye assembly 460 includes a base 462 and an eye 464 which is threaded into base 462. Base 462 is coupled to spacer 450 and housing 440 with fasteners 466.

Figure 17:
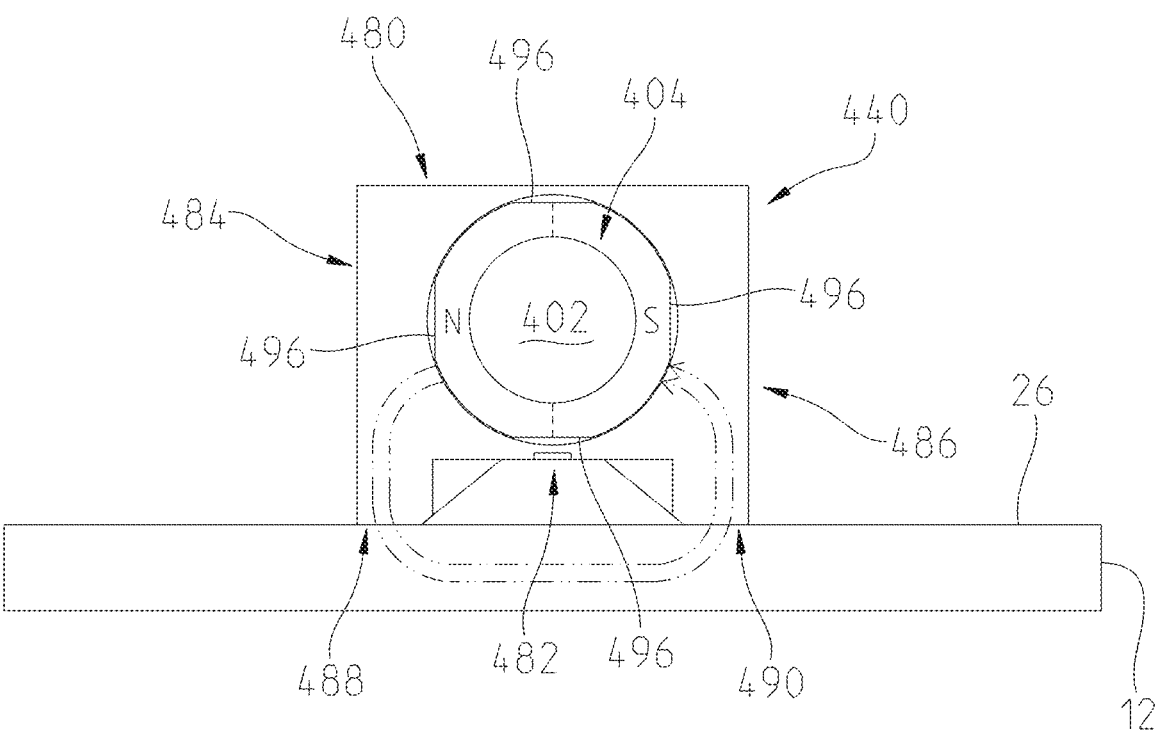
FIG. 17 illustrates the magnetic coupling device of FIG. 12 in an ON state.
Figure 18:
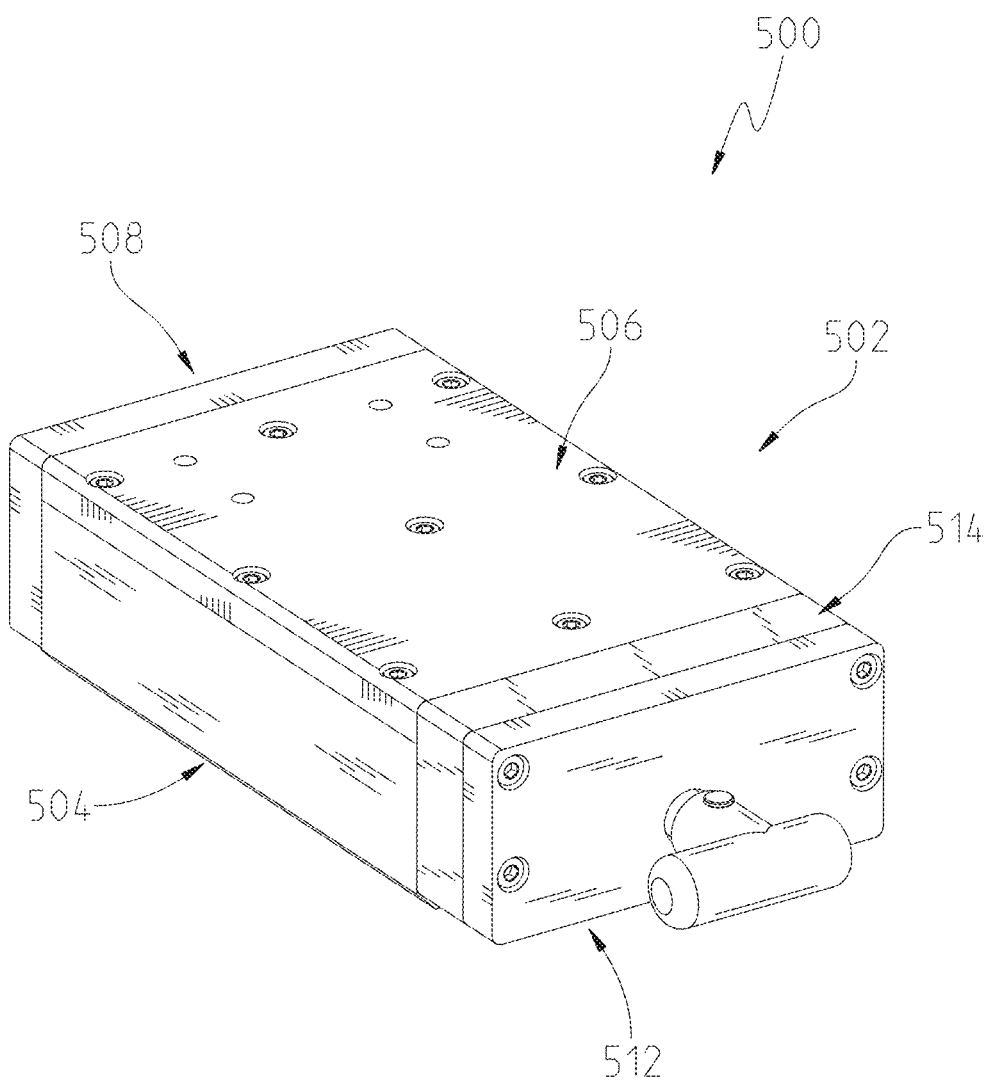
FIG. 18 illustrates an upper perspective view of a further exemplary magnetic coupling device.

Housing 440 includes an upper thin wall web 480, a lower thin wall web 482, a first thick walled pole portion 484, and a second thick walled pole portion 486. Upper thin wall web 480, lower thin wall web 482, first thick walled pole portion 484, and second thick walled pole portion 486 bound opening 442 of housing 440. Referring to FIG. 17, first thick walled pole portion 484 includes a workpiece engagement surface 488 and second thick walled pole portion 486 includes a workpiece engagement surface 490 which contact surface 26 of ferromagnetic workpiece 12 and form a magnetic circuit with ferromagnetic workpiece 12. Upper thin wall web 480 and lower thin wall web 482 have a reduced thickness which restricts a magnetic circuit forming in housing 440 when permanent magnets 404 is in the position shown in FIG. 17 and rather results in the magnetic circuit being formed between permanent magnets 404, housing 440, and ferromagnetic workpiece 12. Spacer 450 is made of a non-ferromagnetic material to not effectively expand the thickness of upper thin wall web 480.

Figure 16:
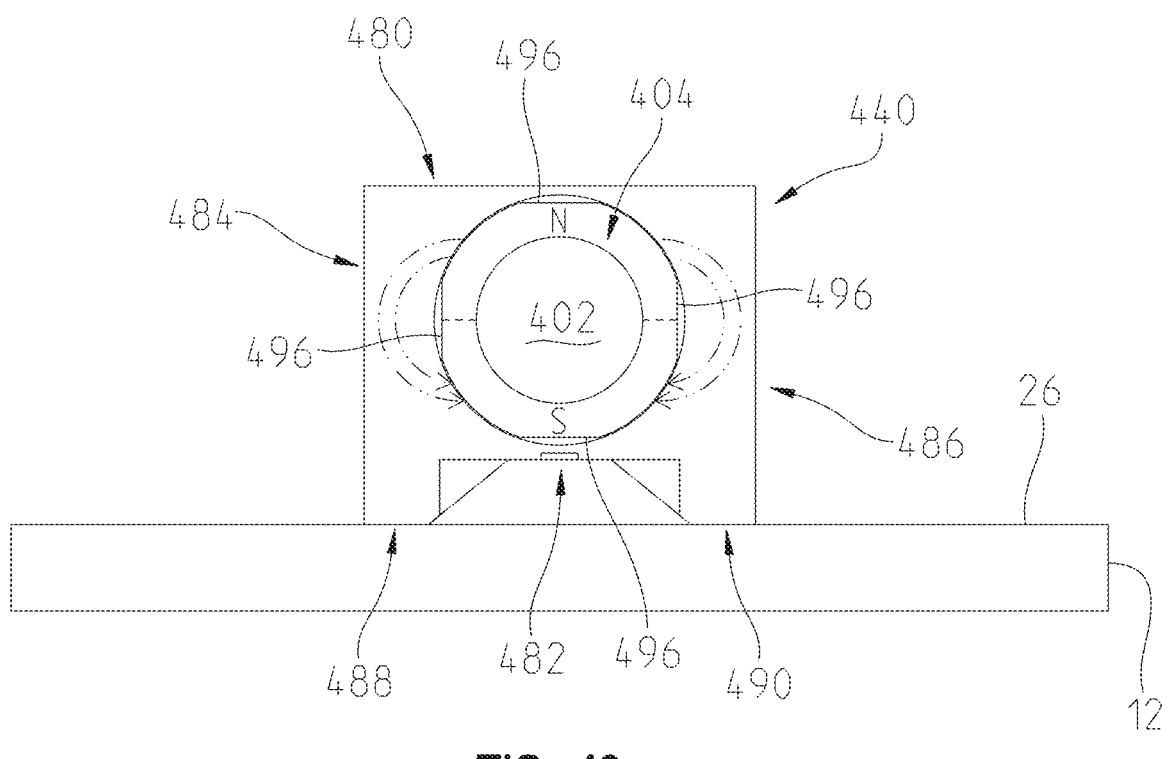
FIG. 16 illustrates the magnetic coupling device of FIG. 12 in an OFF state.

Referring to FIG. 16, first permanent magnet 406 and second permanent magnet 408, collectively permanent magnets 404, are arranged relative to housing 440 such that each of the north pole portion (N) and the south pole portion (S) of first permanent magnet 406 and second permanent magnet 408 are exposed to both first thick walled pole portion 484 and second thick walled pole portion 486. This is the OFF state for the device and the magnetic circuit is completed internally to housing 440. Referring to FIG. 17, both first permanent magnet 406 and second permanent magnet 408 have been rotated 90 degrees or a few degrees beyond 90 degrees (such as between 90 and 93 degrees) clockwise relative to FIG. 16 such that the north pole portion (N) of first permanent magnet 406 and second permanent magnet 408 are exposed to first thick walled pole portion 484 and the south pole portion (S) of first permanent magnet 406 and second permanent magnet 408 are exposed to second thick walled pole portion 486. This results in the magnetic circuit being completed through workpiece engagement surface 488 of first thick walled pole portion 484, ferromagnetic workpiece 12, workpiece engagement surface 490 of second thick walled pole portion 486, and is the ON state for the device. Ferromagnetic core 402 is part of the magnetic circuit in each of the OFF state and the ON state. Each of first permanent magnet 406 and second permanent magnet 408 are carried by ferromagnetic core 402 and are rotated by ferromagnetic core 402 between the positions shown in FIGS. 16 and 17. In embodiments, an actuator 498 is coupled to first end 430 of ferromagnetic core 402 which extends beyond end cap 444.

In embodiments, magnetic coupling device 400 may be placed in one or more partial ON states by rotating permanent magnets 404 and ferromagnetic core 402 less than 90 degrees and holding the position of permanent magnets 404 and ferromagnetic core 402. In embodiments, magnetic coupling device 400 further includes a monitoring system including one or more sensors which monitor a characteristic of magnetic coupling device 400 and/or a characteristic of a magnetic circuit formed between magnetic coupling device 400 and ferromagnetic workpiece 12.

Referring to FIGS. 16 and 17, each of first permanent magnet 406 and second permanent magnet 408 include flats 496 on an outer circumference. Instances of flats 496 are aligned with upper thin wall web 480 and lower thin wall web 482 of housing 440 in both the ON state (FIG. 17) and the OFF state (FIG. 16) of magnetic coupling device 400 and reduce the magnetic flux passing through upper thin wall web 480 and lower thin wall web 482 due to the separation from each of first permanent magnet 406 and second permanent magnet 408.

In embodiments, the outer diameter of ferromagnetic core 402 has a value in the range of 30% to 80% of the outer diameter of first permanent magnet 406 and second permanent magnet 408. In embodiments, the outer diameter of ferromagnetic core 402 has a value in the range of 50% to 80% of the outer diameter of first permanent magnet 406 and second permanent magnet 408. In embodiments, the outer diameter of ferromagnetic core 402 has a value in the range of 50% to 70% of the outer diameter of first permanent magnet 406 and second permanent magnet 408. In embodiments, the outer diameter of ferromagnetic core 402 has a value of at least 30% of the outer diameter of first permanent magnet 406 and second permanent magnet 408. In embodiments, the outer diameter of ferromagnetic core 402 has a value of at least 50% of the outer diameter of first permanent magnet 406 and second permanent magnet 408. In embodiments, the outer diameter of ferromagnetic core 402 has a value of at least 60% of the outer diameter of first permanent magnet 406 and second permanent magnet 408. In embodiments, the outer diameter of ferromagnetic core 402 has a value of at least 70% of the outer diameter of first permanent magnet 406 and second permanent magnet 408.

In embodiments, the magnetic coupling devices disclosed herein have an elongated housing to hold multiple instances of the respective magnetic flux sources and pole portions in a linear array. An exemplary device having multiple instances of magnetic flux sources is the LAY Series unit as manufactured and sold by Magswitch Technology Inc.

Referring to FIGS. 18-23, another exemplary magnetic coupling device 500 is shown. Referring to FIG. 13, a plurality of ferromagnetic cores 402 are provided. Illustratively, two ferromagnetic cores 402 (402A and 402B) are shown. (A and B labels are used throughout the drawings) In the illustrated embodiment, ferromagnetic core 402 is a unitary core. In embodiments, ferromagnetic core 402 includes multiple components which collectively form ferromagnetic core 402. Each ferromagnetic core 402 carries at least one permanent magnet 404. Illustratively, a first permanent magnet 406, a second permanent magnet 408, a third permanent magnet are provided. In embodiments, one, two, or four or more permanent magnets 404 may be provided. Each of first permanent magnet 406, second permanent magnet 408, and third permanent magnet are ring magnets and have a hollow interior 410, 412, 413 respectively. A spacer 420 is provided between first permanent magnet 406 and second permanent magnet 408 and between second permanent magnet 408 and third permanent magnet 409. In embodiments, spacer 420 is made from a non-ferromagnetic material. Spacer 420 key elements 422, illustratively protrusions, which cooperate with key elements 424 on first permanent magnet 406, second permanent magnet 408, and third permanent magnet 409, illustratively slots, to lock an orientation of third permanent magnet 409 and second permanent magnet 408 relative to first permanent magnet 406. Ferromagnetic core 402 is received through interior 410 of first permanent magnet 406, spacer 420, interior 412 of second permanent magnet 408, spacer 420, and interior of third permanent magnet 409.

Figure 19:
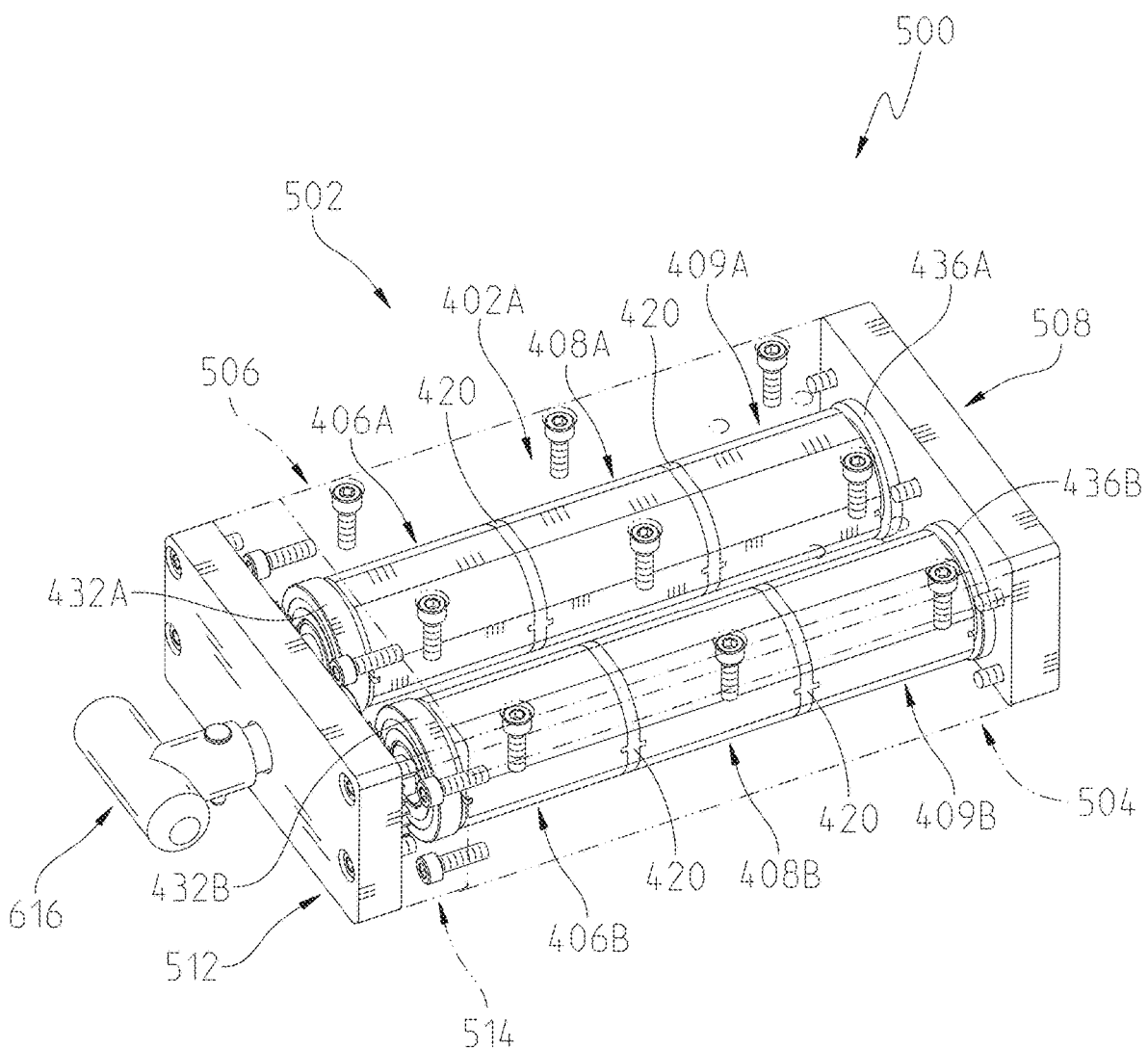
FIG. 19 illustrates a perspective view of the magnetic coupling device of FIG. 18 with the housing shown in transparent to illustrate the internal portions.
Figure 19A:
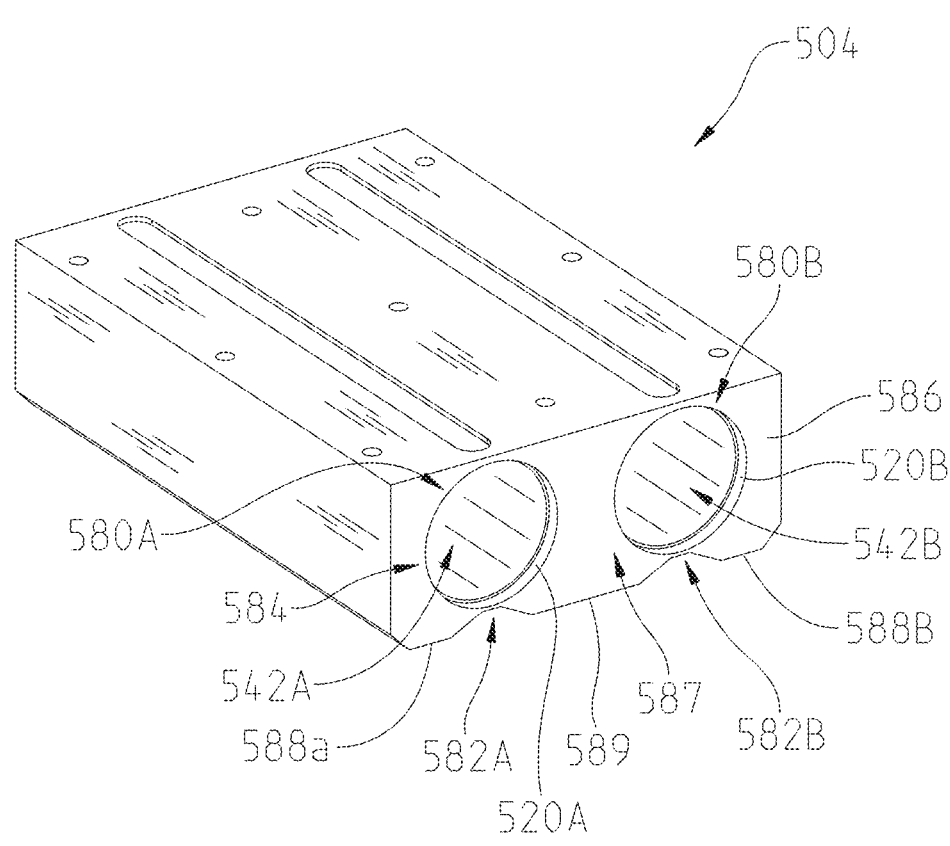
FIG. 19A illustrates a perspective view of a lower housing portion of the magnetic coupling device of FIG. 18.

As shown in FIG. 19, magnetic coupling device 500 includes a housing 502. Housing 502 includes a bottom housing portion 504, a top housing portion 506, a first end cap 508, a second end cap 510, and a transmission housing 520 (see FIG. 19A) in housing 502. Ferromagnetic core 402 receives a first bearing 432 and a second bearing 436. First bearing 432 is received in an opening in transmission housing 514 and an opening in housing 502. Second bearing 436 is received in an opening in first end cap 508 and an opening. Ferromagnetic cores 402 are received in respective openings 442 in a housing 502 (see FIG. 19A). Housing 502 is made of a ferromagnetic material. An exemplary ferromagnetic material is steel. End caps 508, 512, transmission housing 514, and top housing portion 506 are made of a non-ferromagnetic material. In embodiments, top housing portion 506 is a spacer plate and is used to couple a lifting eye assembly 460 (see FIG. 12) to housing 502.

Figure 20:
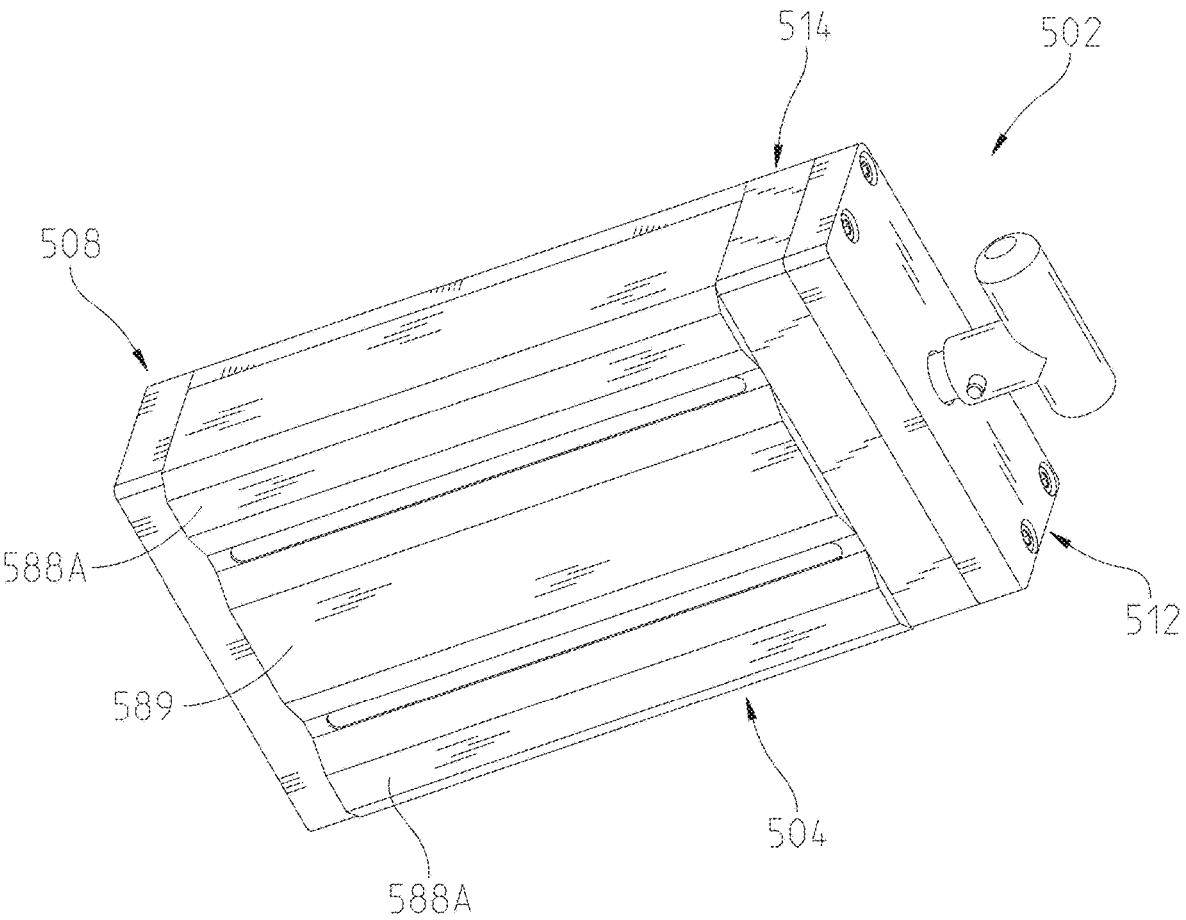
FIG. 20 illustrates a lower perspective view of the magnetic coupling device of FIG. 18.

Housing 502 includes upper thin wall webs 580, lower thin wall webs 582, a first outer thick walled pole portion 584, a second outer thick walled pole portion 586, and a central thick walled portion 587 positioned between opening 542A and opening 542B. Upper thin wall webs 580, lower thin wall webs 582, first outer thick walled pole portion 584, second thick walled pole portion 586, and central thick walled portion 587 bound openings 542 of housing 502. Referring to FIG. 20, first outer thick walled pole portion 584 includes a workpiece engagement surface 588A, second outer thick walled pole portion 586 includes a workpiece engagement surface 588B, and central thick walled portion 587 includes a workpiece engagement surface 589, each of which contact surface 26 of ferromagnetic workpiece 12 and form a magnetic circuit with ferromagnetic workpiece 12. Upper thin wall webs 580 and lower thin wall webs 582 have a reduced thickness which restricts a magnetic circuit forming in bottom housing portion 504 of housing 502 when permanent magnets 406, 408, 409 is in the position shown in FIG. 23 and rather results in the magnetic circuit being formed between permanent magnets 406, 408, 409, bottom housing portion 504, and ferromagnetic workpiece 12. Top housing portion 506 is made of a non-ferromagnetic material to not effectively expand the thickness of upper thin wall web 480.

Figure 21:
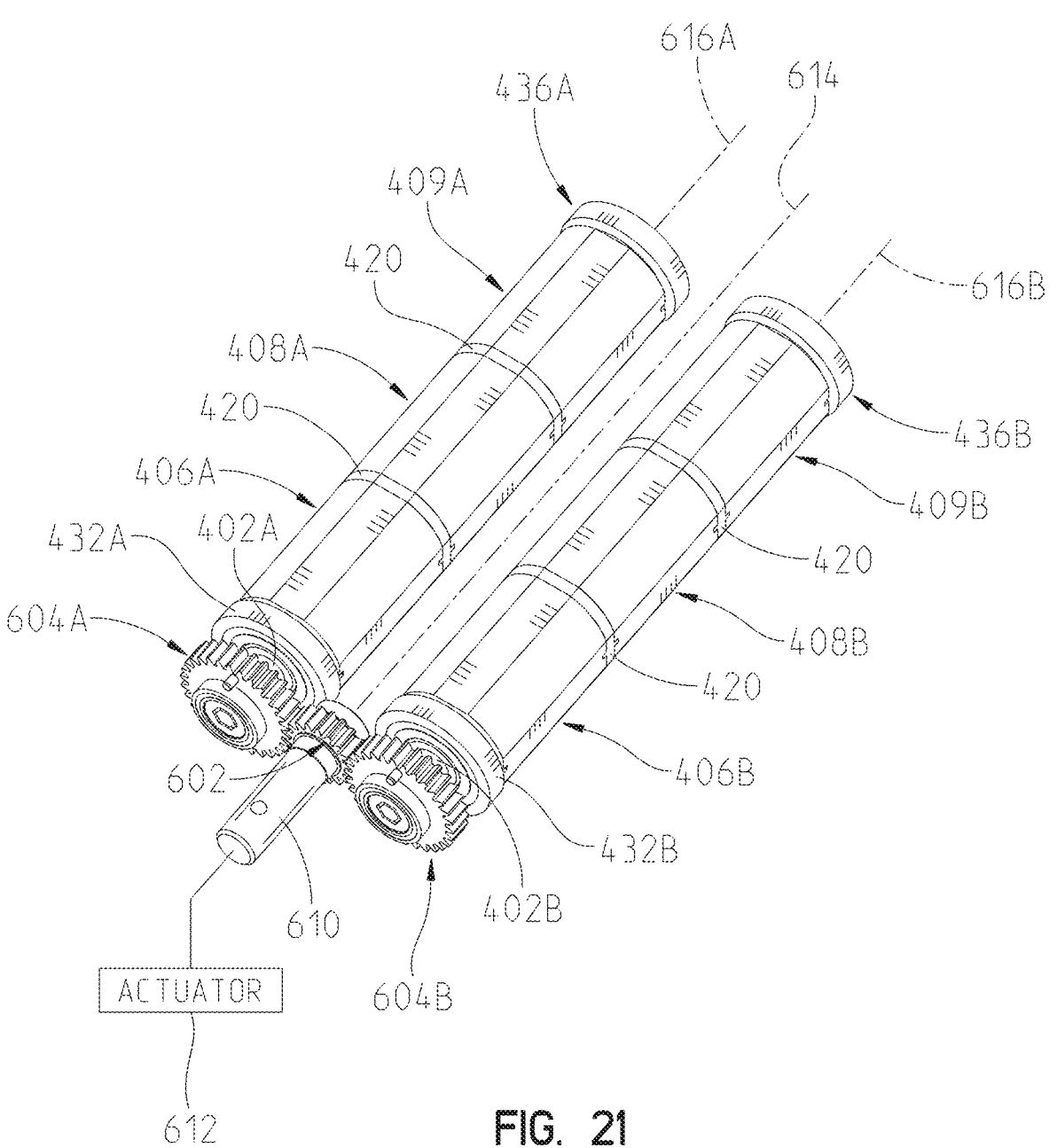
FIG. 21 illustrates an exemplary transmission of the magnetic coupling device of FIG. 18.

Referring to FIG. 21, a transmission 600 is shown. Transmission 600 is housing in transmission housing 514. In the illustrated embodiment, transmission 600 includes a first drive gear 602 which is intermeshed with a pair of driven gears 604. Driven gears 604 are coupled to respective ferromagnetic core 402 such that as the driven gears are rotated, the respective ferromagnetic core 402 is also rotated. Drive gear 602 is carried by a shaft 610 which is operatively coupled to an actuator 612. Actuator 612 causes a rotation of shaft 610 about an axis 614 in one of a clockwise direction or counterclockwise direction. Referring to FIG. 19, an exemplary actuator 612, a T-handle 616, is shown. Other exemplary embodiments include a pneumatic system, a hydraulic system, an electric motor, and other suitable systems to cause a rotation of shaft 610 about axis 614. A rotation of shaft 610 about axis 614 causes a rotation of drive gear 602 about axis 614 in the same direction and a corresponding rotation of driven gears 604 in the opposite direction about respective axis 616.

Figure 22:
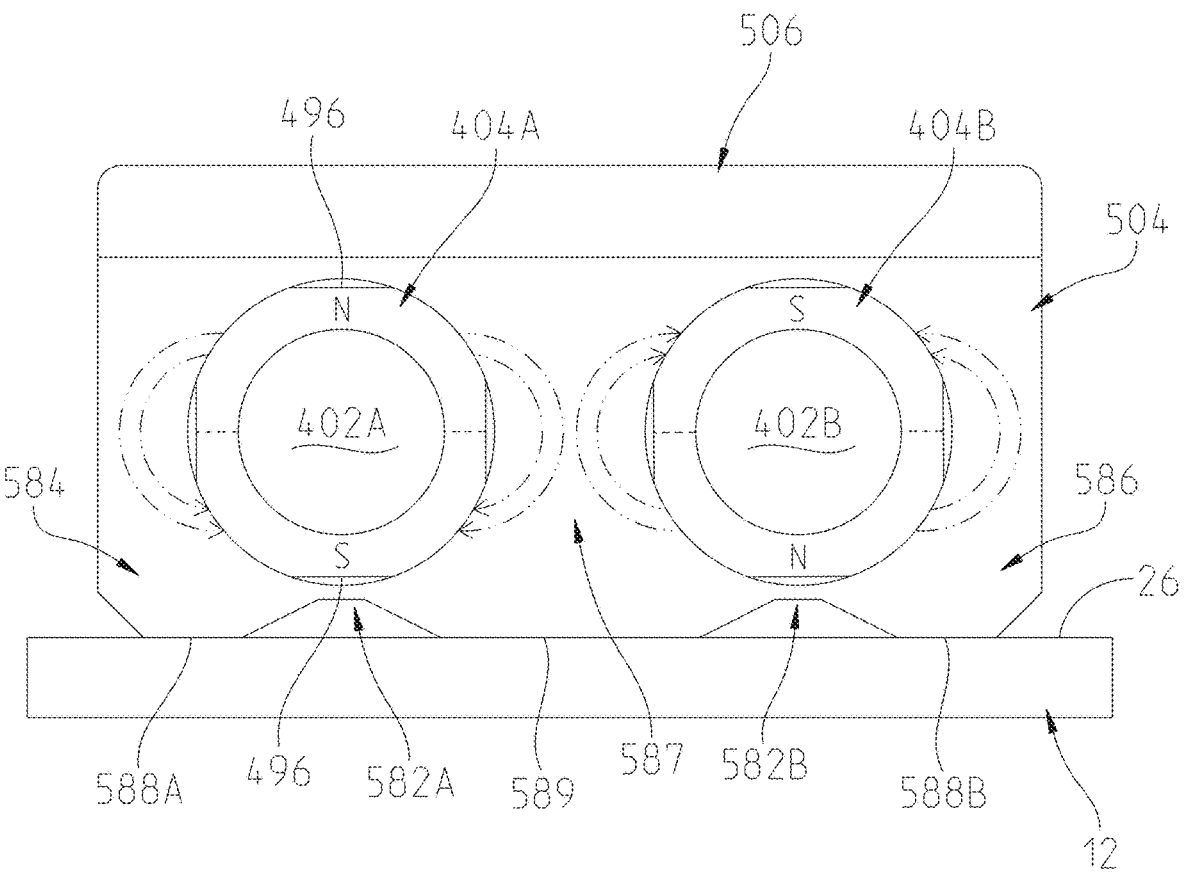
FIG. 22 illustrates the magnetic coupling device of FIG. 18 in an OFF state.
Figure 23:
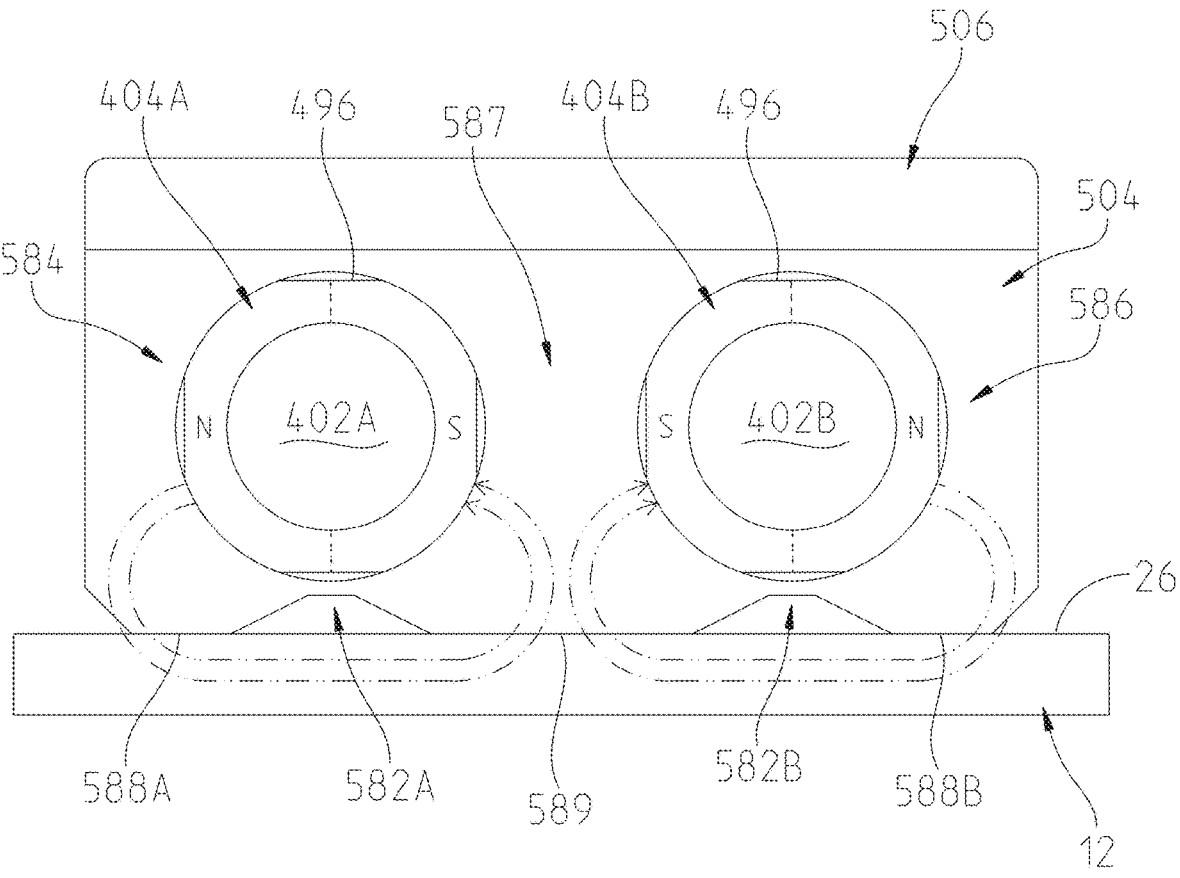
FIG. 23 illustrates the magnetic coupling device of FIG. 18 in an ON state.

Referring to FIGS. 22 and 23, first permanent magnet 406, second permanent magnet 408, and third permanent magnet 409 are collectively permanent magnets 404 and are arranged relative to bottom housing portion 504 of housing 502 in FIG. 22 such that each of the north pole portion (N) and the south pole portion (S) of permanent magnet 404 are exposed to both the central thick walled portion 587 and the respective first outer thick walled pole portion 584 and second outer thick walled pole portion 586. This is the OFF state for the device and the magnetic circuit is completed internally to bottom housing portion 504 of housing 502. Referring to FIG. 23, both permanent magnets 404 have been rotated 90 degrees or a few degrees beyond 90 degrees (such as between 90 and 93 degrees) counterclockwise relative to FIG. 22 such that the north pole portion (N) of first permanent magnet 404A and the north pole portion (N) of second permanent magnet 404B are exposed to first outer thick walled pole portion 584 and second outer thick walled portion 586, respectively, and the south pole portion (S) of each of first permanent magnet 404A and second permanent magnet 404B are exposed to central thick walled pole portion 587. This results in the magnetic circuit being completed through workpiece engagement surface 588A of first thick walled pole portion 584, ferromagnetic workpiece 12, and workpiece engagement surface 589 of central thick walled portion 587 and through workpiece engagement surface 588B of second thick walled pole portion 586, ferromagnetic workpiece 12, and workpiece engagement surface 589 of central thick walled portion 587. In the arrangement of FIG. 23, magnetic coupling device 500 is the ON state for the device. Ferromagnetic core 402 is part of the magnetic circuit in each of the OFF state and the ON state. Each of first permanent magnet 404A and second permanent magnet 404B are carried by respective ferromagnetic cores 402 and are rotated by the respective ferromagnetic cores 402 between the positions shown in FIGS. 22 and 23. In the illustrated embodiment, workpiece engagement surface 589 of central thick walled portion 587 serves as a common south pole portion (S) for magnetic coupling device 500. In other embodiments, permanent magnets 404 are rotated 180 degrees and workpiece engagement surface 589 of central thick walled portion 587 serves as a common north pole portion (N) for magnetic coupling device 500.

Figure 22A:
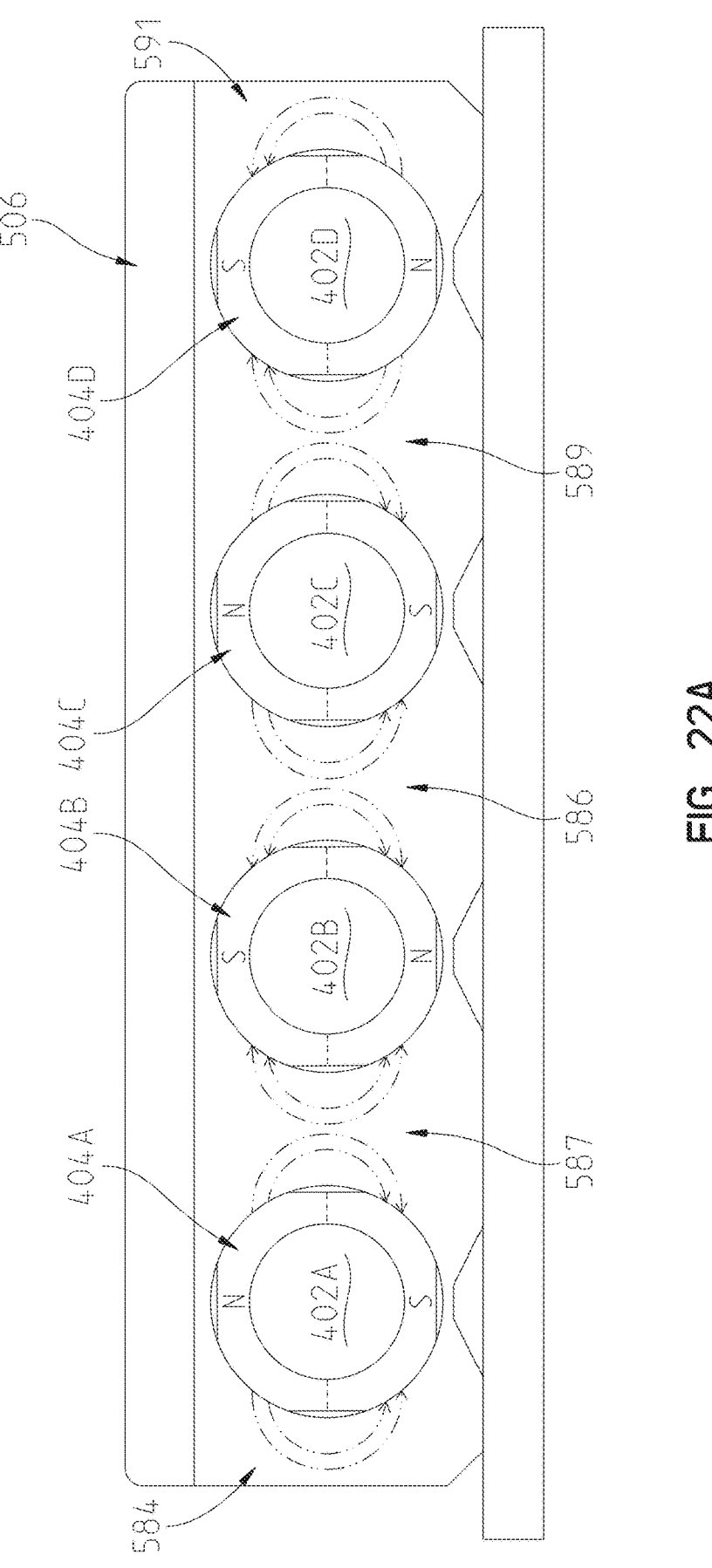
FIG. 22A illustrates an expanded version of the magnetic coupling device of FIG. 18 in an OFF state.
Figure 23A:
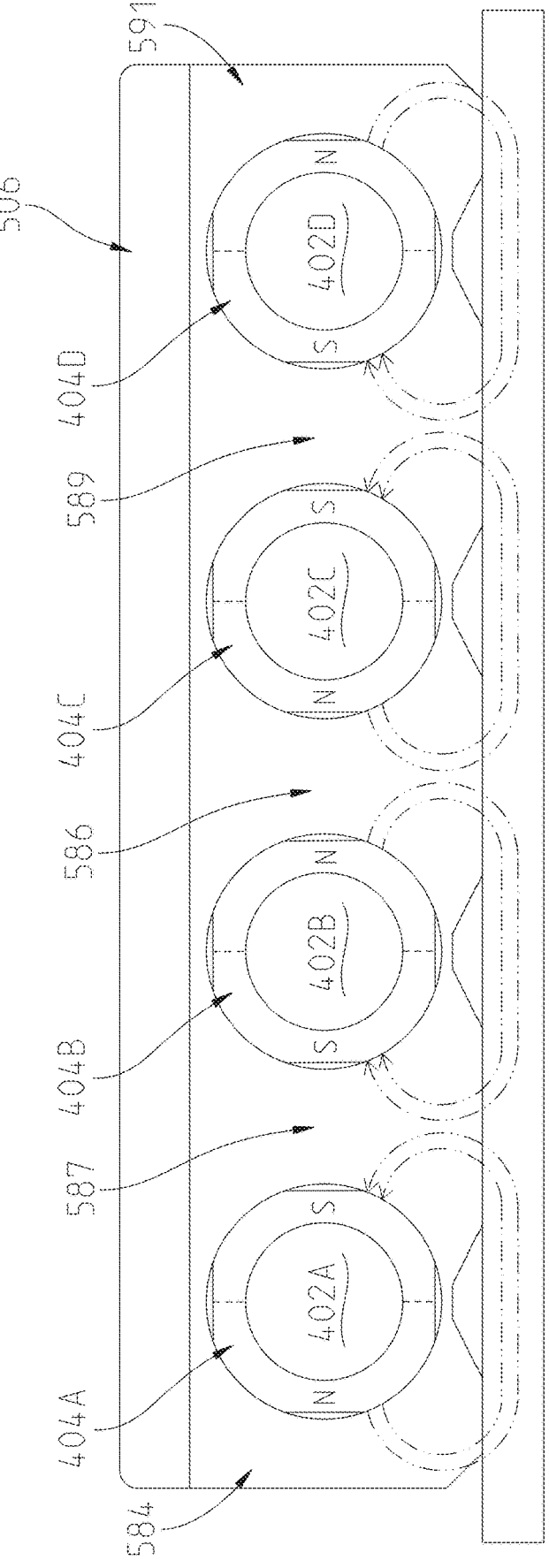
FIG. 23A illustrates the expanded version of the magnetic coupling device of FIG. 18 in an ON state.

Referring to FIGS. 22A and 23A, additional ferromagnetic cores 402 and permanent magnets 404 may be added resulting in a device having more than one common pole. As shown in FIG. 22A, ferromagnetic cores 402A-D are received by permanent magnets 404A-D. Transmission 600 also includes additional gears (not shown) to couple each of ferromagnetic cores 402A-D together such that they may be rotated simultaneously. In FIG. 22A, like FIG. 22, the device is in the OFF state. In FIG. 23A, like FIG. 23, the device is in the ON state. Thick walled portion 584, like FIG. 23, is a north pole of the device and thick walled portion 587, like FIG. 23, is a south pole portion of the device. Thick walled portion 586 is wider than FIG. 23 and is a common north pole for permanent magnets 404B and 404C. Thick walled portion 589 is a common south pole for permanent magnets 404B and 404C. Thick walled portion 591 is a north pole portion of the device. Although two magnets are shown laterally aligned in FIGS. 22 and 23 and four are shown laterally aligned in FIGS. 22A and 23A, any number of magnets may be laterally aligned and included in the device and the number of common poles is one less than the number of magnets.

In embodiments, magnetic coupling device 500 may be placed in one or more partial ON states by rotating permanent magnets 404 and ferromagnetic core 402 less than 90 degrees and holding the position of permanent magnets 404 and ferromagnetic core 402. In embodiments, magnetic coupling device 500 further includes a monitoring system including one or more sensors which monitor a characteristic of magnetic coupling device 500 and/or a characteristic of a magnetic circuit formed between magnetic coupling device 500 and ferromagnetic workpiece 12.

Each of magnetic coupling device 400 and magnetic coupling device 500 may further include pole extensions which are made of a ferromagnetic material and are placed between the respective disclosed workpiece contact surfaces and the ferromagnetic workpiece 12. The pole extensions serve as the workpiece contact surfaces in these embodiments.

Figure 24:
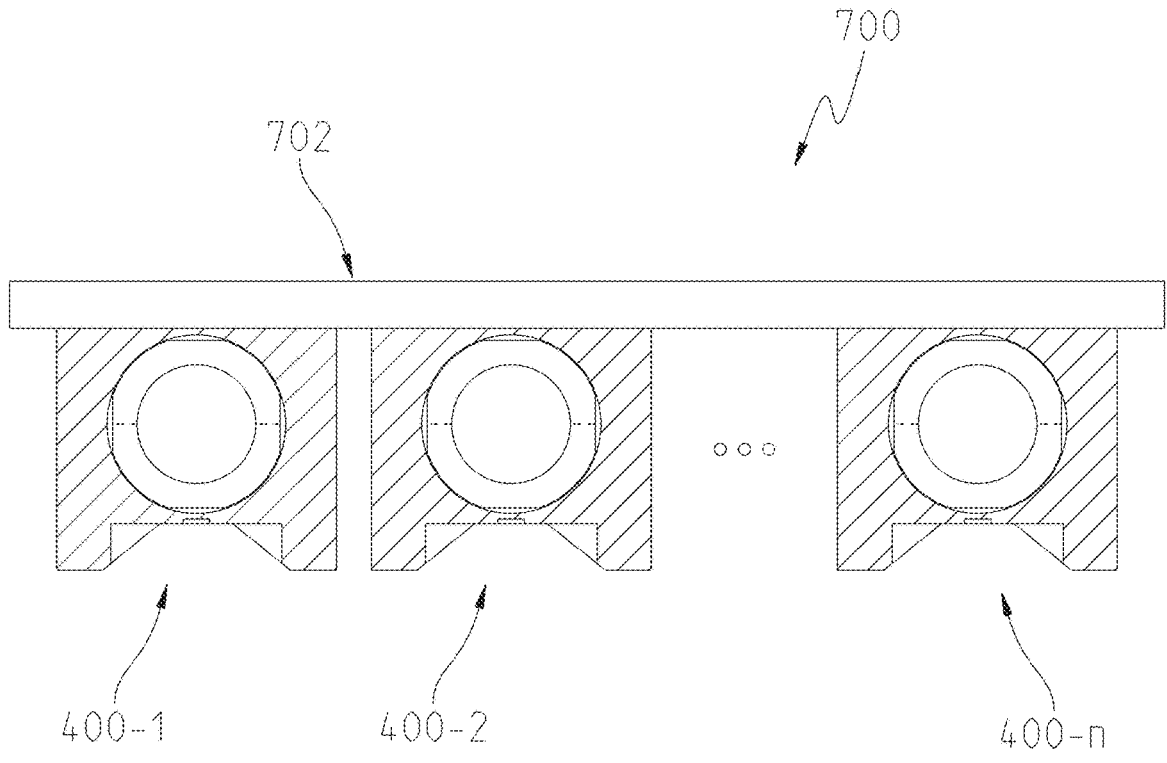
FIG. 24 illustrates further yet exemplary magnetic coupling device.

Referring to FIG. 24, an exemplary magnetic coupling device 700 is shown. Magnetic coupling device 700 includes multiple instances of magnetic coupling device 400, illustratively 400-1, 400-2, and 400-n and a support 702. Each of magnetic coupling device 400 are coupled to support 702, such as with removable fasteners, to hold the relative spaced apart positions of each of magnetic coupling device 400. Support 702 may be a single piece or multiple pieces. Although magnetic coupling device 700 is shown with multiple instances of magnetic coupling device 400, magnetic coupling device 700 may instead include multiple instances of magnetic coupling device 500 or other magnetic coupling devices disclosed herein.

Figure 25:
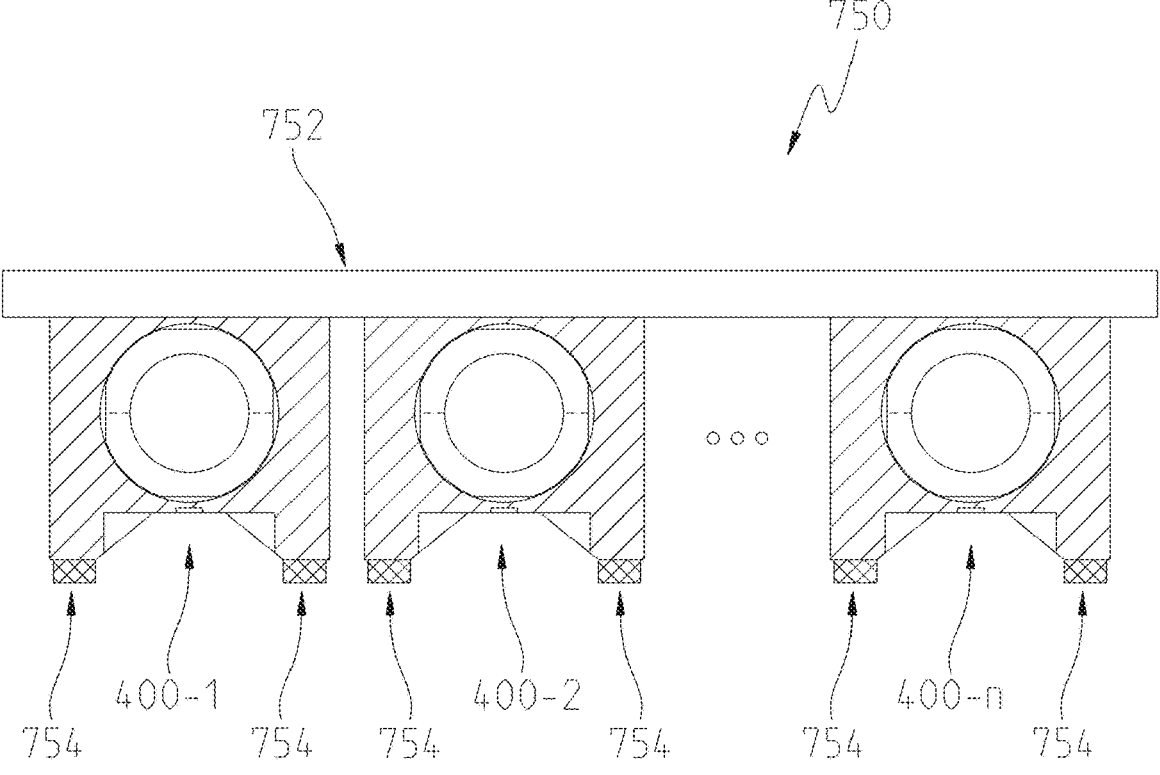
FIG. 25 illustrates further yet another exemplary magnetic coupling device.

Referring to FIG. 25, an exemplary magnetic coupling device 750 is shown. Magnetic coupling device 750 includes multiple instances of magnetic coupling device 400, illustratively 400-1, 400-2, and 400-n and a support 752. Each of magnetic coupling device 400 are coupled to support 752, such as with removable fasteners, to hold the relative spaced apart positions of each of magnetic coupling device 400. Support 752 may be a single piece or multiple pieces. Although magnetic coupling device 750 is shown with multiple instances of magnetic coupling device 400, magnetic coupling device 750 may instead include multiple instances of magnetic coupling device 500 or other magnetic coupling devices disclosed herein. Each of magnetic coupling device 400 includes respective pole extensions 754 coupled to the respective magnetic coupling device 400.

Figure 26:
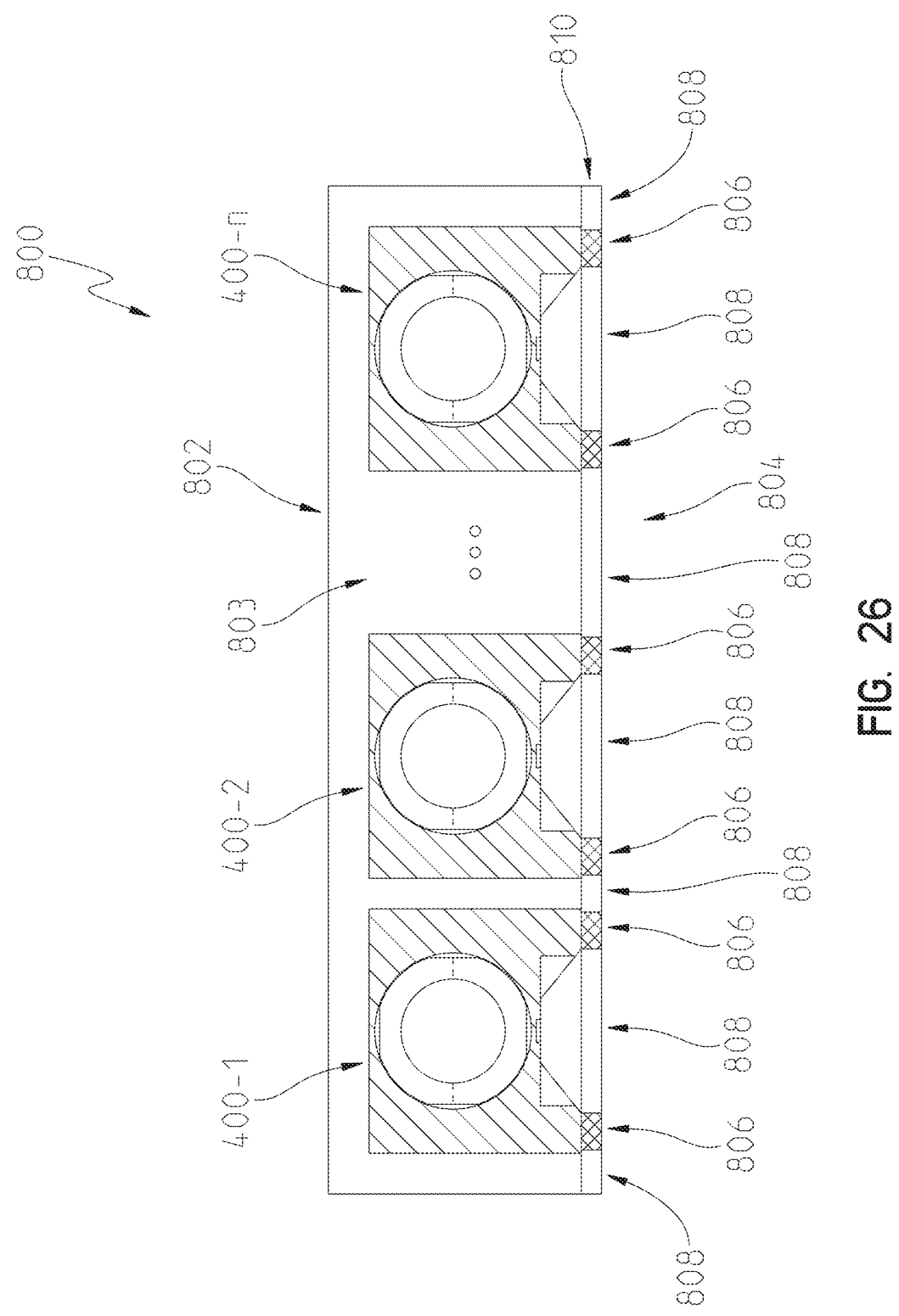
FIG. 26 illustrates still another exemplary magnetic coupling device.

Referring to FIG. 26, an exemplary magnetic coupling device 800 is shown. Magnetic coupling device 800 includes multiple instances of magnetic coupling device 400, illustratively 400-1, 400-2, and 400-n and a support 802 having an interior 803 to receive each of magnetic coupling device 400. Each of magnetic coupling device 400 are coupled to support 802, such as with removable fasteners, to hold the relative spaced apart positions of each of magnetic coupling device 400. Support 802 may be a single piece or multiple pieces. Further, a pole extension support 810 is coupled to support 802, such as with removable fasteners. Pole extension support includes a plurality of pole extension portions 806 made of ferromagnetic material and aligned with respective poles of the magnetic coupling device 400 and a plurality of insulating portions 808 made of non-ferromagnetic material. Although magnetic coupling device 800 is shown with multiple instances of magnetic coupling device 400, magnetic coupling device 800 may instead include multiple instances of magnetic coupling device 500 or other magnetic coupling devices disclosed herein.

Figure 27:
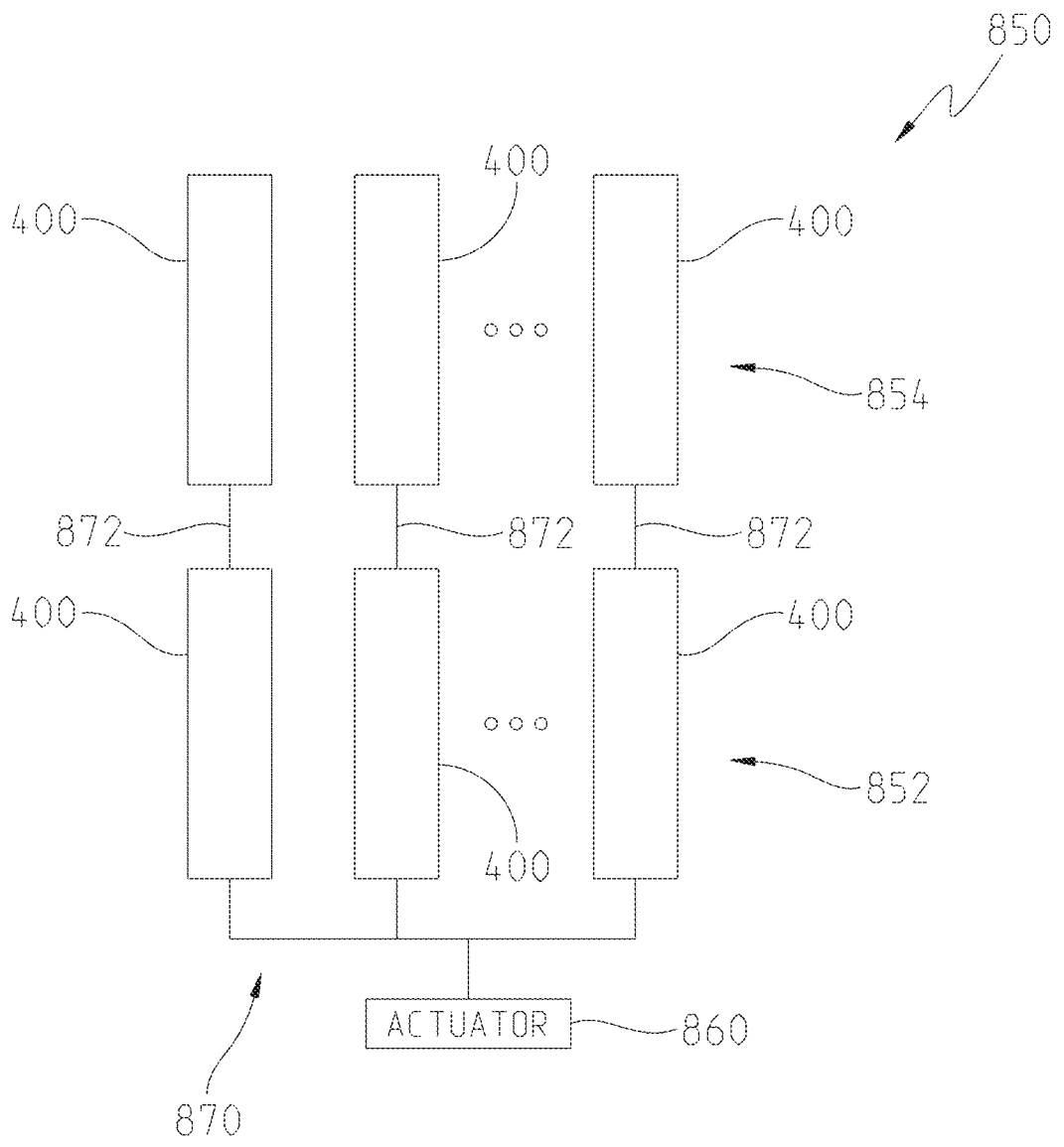
FIG. 27 illustrates yet still another exemplary magnetic coupling device.

Referring to FIG. 27, an exemplary magnetic coupling device 850 is shown. Magnetic coupling device 850 includes multiple instances of magnetic coupling device 400 arranged in a first row 852 and a second row 854. In embodiments, additional rows of magnetic coupling device 400 are provided. The rotation of permanent magnet 404 in each of magnetic coupling device 400 is controlled by an actuator 860 is operatively coupled to each of magnetic coupling device 400. Actuator 860 may be coupled to each of magnetic coupling device 400 in first row 852 through a transmission 870, such as a gear transmission as described herein. Actuator 860 may be coupled to each of magnetic coupling device 400 in second row 854 through connecting shafts 872 coupling the ferromagnetic core 402 of the respective magnetic coupling device 400 in the first row 852 to the respective magnetic coupling device 400 in the second row 854. Although magnetic coupling device 850 is shown with multiple instances of magnetic coupling device 400, magnetic coupling device 850 may instead include multiple instances of magnetic coupling device 500 or other magnetic coupling devices disclosed herein.

Figure 28:
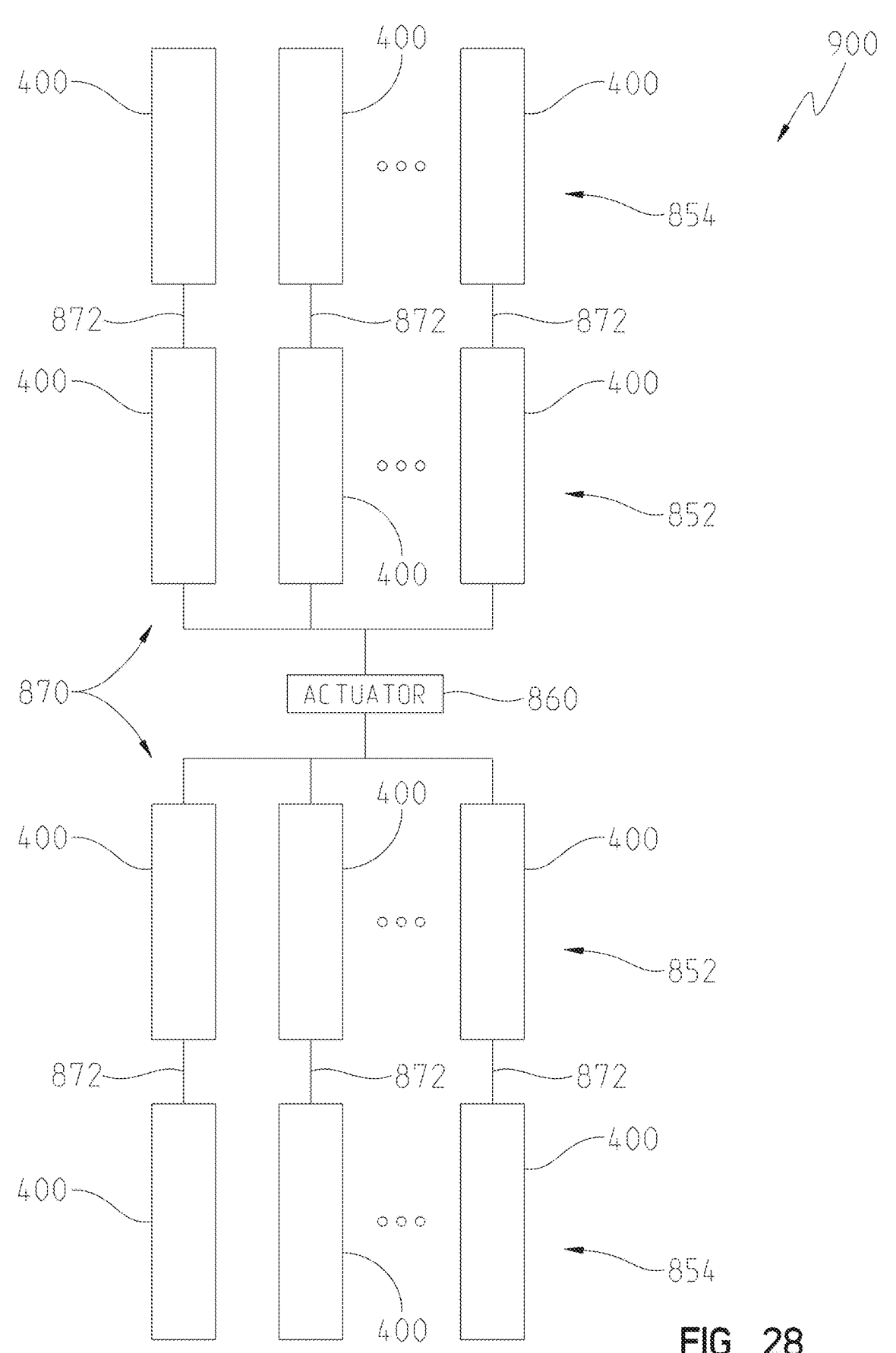
FIG. 28 illustrates a further still exemplary magnetic coupling device.

Referring to FIG. 28, an exemplary magnetic coupling device 900 is shown. Magnetic coupling device 900 differs from magnetic coupling device 850 in that magnetic coupling device 400 are provided on both sides of actuator 860, thereby increasing, such as doubling, the number of magnetic coupling device 400 actuated by actuator 860. Although magnetic coupling device 900 is shown with multiple instances of magnetic coupling device 400, magnetic coupling device 900 may instead include multiple instances of magnetic coupling device 500 or other magnetic coupling devices disclosed herein.

In embodiments, the magnetic coupling devices disclosed herein have an elongated housing to hold multiple instances of the respective magnetic flux sources and pole portions in a linear array. An exemplary device having multiple instances of magnetic flux sources is the LAY Series unit as manufactured and sold by Magswitch Technology Inc.

In embodiments, the magnetic coupling devices disclosed herein have an elongated housing to hold multiple instances of the respective magnetic flux sources and pole portions in a circular array. An exemplary device having multiple instances of magnetic flux source 15 is the AY Series unit as manufactured and sold by Magswitch Technology Inc.

In embodiments, the magnetic coupling devices disclosed herein may be used as part of a fixture to hold a ferromagnetic part or an end-of-arm-tool for a robot which is able to couple and move a ferromagnetic part.

EXAMPLES

Example 1. A magnetic coupling device for magnetically coupling to a ferromagnetic workpiece may comprise a housing; a switchable magnetic flux source supported by the housing; and a plurality of pole portions. The switchable magnetic flux source may be switchable between at least an OFF state and an ON state. Each of the plurality of pole portions may have at least one workpiece engagement surface. The switchable magnetic flux source may include at least one permanent magnet and at least one ferromagnetic core. The at least one permanent magnet may surround the at least one ferromagnetic core.

Example 2. The magnetic coupling device of Example 1, wherein the at least one permanent magnet and the at least one ferromagnetic core may be recessed relative to the at least one workpiece engagement surface of each of the plurality of pole portions.

Example 3. The magnetic coupling device of any one of Examples 1 and 2, wherein the at least one permanent magnet may include a first permanent magnet. The at least one ferromagnetic core may include a first ferromagnetic core. The first permanent magnet may surround the first ferromagnetic core. The first permanent magnet and the first ferromagnetic core may be rotatable relative to the housing about a first axis.

Example 4. The magnetic coupling device of Example 3, wherein the at least one permanent magnet may include a second permanent magnet. The second permanent magnet surrounds the first ferromagnetic core.

Example 5. The magnetic coupling device of Example 4, wherein the second permanent magnet may be spaced apart from the first permanent magnet.

Example 6. The magnetic coupling device of any one of Examples 4 and 5, wherein each of the first permanent magnet and the second permanent magnet may surround a circumference of the ferromagnetic core.

Example 7. The magnetic coupling device of any one of Examples 4-6, wherein the second permanent magnet may be rotatable relative to the housing about the first axis.

Example 8. The magnetic coupling device of Example 7, wherein the first permanent magnet, the second permanent magnet, and the first ferromagnetic core may be rotatable relative to the housing about the first axis as a group.

Example 9. The magnetic coupling device of any one of Examples 1 and 2, wherein the at least one permanent magnet may include a first permanent magnet and a second permanent magnet and the at least one ferromagnetic core may include a first ferromagnetic core and a second ferromagnetic core. The first permanent magnet may surround the first ferromagnetic core and the second permanent magnet may surround the second ferromagnetic core.

Example 10. The magnetic coupling device of Example 9, wherein the first permanent magnet may be spaced apart from the second permanent magnet. The first ferromagnetic core may be spaced apart from the second ferromagnetic core.

Example 11. The magnetic coupling device of any one of Examples 9 and 10, wherein the second permanent magnet may rotatable relative to the first permanent magnet about a first axis. The second ferromagnetic core may be rotatable relative to the first ferromagnetic core about the first axis.

Example 12. The magnetic coupling device of Example 11, wherein the second permanent magnet and the second ferromagnetic core may be rotatable relative to the housing about the first axis as a group.

Example 13. The magnetic coupling device of any one of Examples 9-12, wherein the first permanent magnet may surround a circumference of the first ferromagnetic core. The second permanent magnet may surround a circumference of the second ferromagnetic core.

Example 14. The magnetic coupling device of any of Examples 3-13, wherein an outer diameter of the first ferromagnetic core may have a value in the range of 30% to 80% of an outer diameter of the first permanent magnet, preferably the outer diameter of the first ferromagnetic core may have a value in the range of 50% to 80% of the outer diameter of the first permanent magnet, and more preferably the outer diameter of the first ferromagnetic core may have a value in the range of 50% to 70% of the outer diameter of the first permanent magnet.

Example 15. The magnetic coupling device of any of Examples 3-13 wherein an outer diameter of the first ferromagnetic core may have a value of at least 50% of an outer diameter of the first permanent magnet, preferably the outer diameter of the first ferromagnetic core may have a value of at least 60% of the outer diameter of the first permanent magnet, and more preferably the outer diameter of the first ferromagnetic core may have a value of at least 70% of the outer diameter of the first permanent magnet.

Example 16. The magnetic coupling device of any of Examples 3-15, may further comprise an actuator. The at least one permanent magnet may be coupled to the actuator through the at least one ferromagnetic core.

Example 17. The magnetic coupling device of Example 1, wherein the plurality of pole portions may include a first pole portion, a second pole portion, and a third pole portion and the switchable magnetic flux source may include a first permanent magnet surrounding a first ferromagnetic core and a second permanent magnet surrounding a second ferromagnetic core.

Example 18. The magnetic coupling device of Example 17, wherein the first permanent magnet and the first ferromagnetic core may be rotatable about a first axis and the second permanent magnet and the second ferromagnetic core are rotatable about a second axis, the second axis may be spaced apart from the first axis.

Example 19. The magnetic coupling device of Example 18, wherein the first axis may be parallel to the second axis.

Example 20. The magnetic coupling device of any one of Examples 18 and 19, wherein the second pole portion may be positioned between the first pole portion and the third pole portion and the second pole portion may be positioned between the first axis and the second axis.

Example 21. The magnetic coupling device of Example 20, wherein the second pole portion may be a common pole of the first permanent magnet and the second permanent magnet when the switchable magnetic flux source is in the ON state.

Example 22. The magnetic coupling device of any one of Examples 17-21, wherein a common actuator may actuate the first permanent magnet and the first ferromagnetic core between at least the OFF state and the ON state and may actuate the second permanent magnet and the second ferromagnetic core between at least the OFF state and the ON state.

Example 23. The magnetic coupling device of Example 22, wherein the common actuator may simultaneously actuate the first permanent magnet and the first ferromagnetic core between at least the OFF state and the ON state and actuate the second permanent magnet and the second ferromagnetic core between at least the OFF state and the ON state.

Example 24. The magnetic coupling device of any one of Examples 1-23, wherein the at least one ferromagnetic core may include at least one channel.

Example 25. The magnetic coupling device of Example 24, wherein the at least one channel may receive one or more sensors, stationary pins, retractable pins, probes, and/or additional tools.

Example 26. The magnetic coupling device of any of Examples 1-25, may further comprise a monitoring system including one or more sensors which monitor a characteristic of the magnetic coupling device.

Example 27. The magnetic coupling device of any of Examples 1-25, may further comprise a monitoring system including one or more sensors which monitor a characteristic of a magnetic circuit formed between magnetic coupling device and the ferromagnetic workpiece.

Example 28. The magnetic coupling device of any of Examples 1-27, may further comprise a proximity sensor to detect a proximity to the ferromagnetic workpiece.

Example 29. The magnetic coupling device of any one of Examples 1-28, wherein the switchable magnetic flux source may be further switchable to at least one partial ON state, the partial ON state has a first strength of a magnetic circuit formed through ferromagnetic workpiece which is more than a second strength of the magnetic circuit formed through the ferromagnetic workpiece when the switchable magnetic flux source is in the OFF state and which is less than a third strength of the magnetic circuit formed through the ferromagnetic workpiece when the switchable magnetic flux source is in the ON state.

Example 30. The magnetic coupling device of any of Examples 3-15 and 17-29, may further comprise an actuator, the actuator being a manual actuator, a hydraulic actuator, a pneumatic actuator, a mechanical actuator, an electrically controlled actuator, or a combination thereof.

Example 31. The magnetic coupling device of any one of Examples 1-30, wherein the at least one permanent magnet may include at least one electro-permanent magnet.

Example 32. The magnetic coupling device of any one of Examples 1-30, wherein the at least one permanent magnet may include at least one rare earth permanent magnet.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A magnetic coupling device for magnetically coupling to a ferromagnetic workpiece, comprising:
   a housing including a first end and a second end, the housing extending in a vertical direction and having a central cavity extending between the first end and the second end;
   a switchable magnetic flux source supported by the housing and positioned in the central cavity, the switchable magnetic flux source being switchable between at least an OFF state and an ON state, the switchable magnetic flux source comprising a ferromagnetic core and at least one permanent magnet surrounding the ferromagnetic core, the switchable magnetic flux source rotatable about a rotational axis transverse to the vertical direction; and
   a plurality of pole portions comprising a first pole portion defining a first workpiece interface and a second pole portion defining a second workpiece interface spaced apart from the first workpiece interface, the first workpiece interface and the second workpiece interface configured to engage the ferromagnetic workpiece, and the rotational axis is positioned laterally intermediate each of the first workpiece interface and the second workpiece interface.

2. The magnetic coupling device of claim 1, further comprising a bearing is positioned in the central cavity.

3. The magnetic coupling device of claim 2, wherein the at least one permanent magnet defines a flat portion, and an air gap is defined between the flat portion of the at least one permanent magnet and the housing when the switchable magnetic flux source is positioned within the central cavity.

4. The magnetic coupling device of claim 3, wherein the housing defines a first thick walled portion positioned on a first side of the switchable magnetic flux source and a second thick walled portion positioned on a second side of the switchable magnetic flux source opposite the first side, and a thin walled portion extending between the first thick walled portion and the second thick walled portion.

5. The magnetic coupling device of claim 4, wherein the first thick walled portion is positioned adjacent the first pole portion and the second thick walled portion is positioned adjacent the second pole portion.

6. The magnetic coupling device of claim 4, wherein when the switchable magnetic flux source is in the ON state, the flat portion is positioned adjacent the thin walled portion of the housing and a magnetic circuit is established between a north pole portion of the at least one permanent magnet, the first pole portion, the ferromagnetic workpiece, the second pole portion, and a south pole portion of the at least one permanent magnet.

7. The magnetic coupling device of claim of claim 1, wherein the switchable magnetic flux source is a first switchable magnetic flux source, and a second switchable magnetic flux source is supported by the housing, the second switchable magnetic flux source being switchable between at least an OFF state and an ON state, the second switchable magnetic flux source comprising at least one permanent magnet rotatable about a second rotational axis being parallel to the rotational axis of the first switchable magnetic flux source.

8. The magnetic coupling device of claim 7, further comprising a third pole portion defining a third workpiece interface laterally spaced from the first workpiece interface and the second workpiece interface, wherein the second rotational axis is positioned laterally intermediate each of the second workpiece interface and the third workpiece interface.

9. The magnetic coupling device of claim 1, wherein the at least one permanent magnet includes a first permanent magnet rotatable about the rotational axis and a second permanent magnet rotatable about the rotational axis, the second permanent magnet offset from the first permanent magnet along the rotational axis.

10. The magnetic coupling device of claim 9, further comprising a spacer positioned intermediate the first permanent magnet and the second permanent magnet.

11. The magnetic coupling device of claim 9, further comprising a first bearing positioned adjacent a first end of the switchable magnetic flux source and a second bearing positioned adjacent a second end of the switchable magnetic flux source, the switchable magnetic flux source rotatable about each of the first bearing and the second bearing.

12. The magnetic coupling device of claim 9, wherein the ferromagnetic core extends through each of the first permanent magnet and the second permanent magnet.

13. The magnetic coupling device of claim 12, further comprising an actuator operably coupled to the switchable magnetic flux source, the actuator operable to switch the switchable magnetic flux source between the OFF state and the ON state.

14. The magnetic coupling device of claim 13, wherein the switchable magnetic flux source is a first switchable magnetic flux source, and a second switchable magnetic flux source is supported by the housing, the second switchable magnetic flux source being switchable between at least an OFF state and an ON state, and the actuator is operably coupled to each of the first switchable magnetic flux source and the second switchable magnetic flux source, the actuator operable to switch each of the first switchable magnetic flux source and the second switchable magnetic flux source between the OFF state and the ON state.

15. The magnetic coupling device of claim 14, further comprising a first driven gear coupled with the first switchable magnetic flux source and a second driven gear coupled with the switchable magnetic flux source, and the actuator is operably coupled with each of the first driven gear and the second driven gear.

16. The magnetic coupling device of claim 1, further comprising an actuator operably coupled to the switchable magnetic flux source, the actuator operable to switch the switchable magnetic flux source between the OFF state and the ON state, wherein the actuator is a hydraulic actuator.

17. The magnetic coupling device of claim 13, wherein the actuator includes an electronically controlled actuator.

18. The magnetic coupling device of claim 1, further comprising at least one sensor adapted to monitor a characteristic of the magnetic coupling device.

19. The magnetic coupling device of claim 18, wherein the at least one sensor is positioned adjacent the first pole portion.

20. The magnetic coupling device of claim 19, wherein the at least one sensor is adapted to monitor a magnetic characteristic of the magnetic coupling device.

* * * * *